US011528603B2

(12) United States Patent
Lee et al.

(10) Patent No.: US 11,528,603 B2
(45) Date of Patent: Dec. 13, 2022

(54) ACCESS STRATUM SECURITY FOR EFFICIENT PACKET PROCESSING

(71) Applicant: QUALCOMM Incorporated, San Diego, CA (US)

(72) Inventors: Soo Bum Lee, San Diego, CA (US); Keiichi Kubota, Tokyo (JP); Adrian Edward Escott, Reading (GB); Gavin Bernard Horn, La Jolla, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 16/936,347

(22) Filed: Jul. 22, 2020

(65) Prior Publication Data

US 2020/0351256 A1 Nov. 5, 2020

Related U.S. Application Data

(63) Continuation of application No. 15/710,991, filed on Sep. 21, 2017, now Pat. No. 10,728,756.
(Continued)

(51) Int. Cl.
*H04W 12/04* (2021.01)
*H04L 9/40* (2022.01)
(Continued)

(52) U.S. Cl.
CPC ......... *H04W 12/04* (2013.01); *H04L 63/0428* (2013.01); *H04L 63/068* (2013.01);
(Continued)

(58) Field of Classification Search
CPC .................................................... H04W 12/04
See application file for complete search history.

(56) References Cited

U.S. PATENT DOCUMENTS 5,751,813 A * 5/1998 Dorenbos ........... H04L 63/0442
380/270
6,993,138 B1 1/2006 Hardjono
(Continued)

FOREIGN PATENT DOCUMENTS

CN 101702818 A 5/2010
CN 102461218 A 5/2012
(Continued)

OTHER PUBLICATIONS

Taiwan Search Report—TW106132564—TIPO—dated Mar. 24, 2021.
(Continued)

*Primary Examiner* — Bradley W Holder
(74) *Attorney, Agent, or Firm* — Patterson + Sheridan, LLP

(57) ABSTRACT

Certain aspects of the present disclosure provide techniques for managing security keys for enciphering and deciphering packets transmitted in a wireless communications system. According to certain aspects, a method of wireless communication by a user equipment (UE) is provided. The method generally includes obtaining an indication of a key area identifier (ID) of a first cell node, wherein the key area ID identifies a set of cell nodes that are associated with a network node that uses a first key for enciphering or deciphering messages and communicating a first set of messages with the first cell node using the first key for enciphering or deciphering the first set of messages.

5 Claims, 18 Drawing Sheets

Related U.S. Application Data

(60) Provisional application No. 62/398,699, filed on Sep. 23, 2016.

(51) Int. Cl.

| | |
|---|---|
| *H04W 12/03* | (2021.01) |
| *H04W 12/041* | (2021.01) |
| *H04W 12/043* | (2021.01) |
| *H04W 12/062* | (2021.01) |
| *H04W 36/00* | (2009.01) |
| *H04W 48/16* | (2009.01) |
| *H04W 24/02* | (2009.01) |
| *H04W 48/18* | (2009.01) |
| *H04W 12/06* | (2021.01) |
| *H04L 9/08* | (2006.01) |

(52) U.S. Cl.
CPC ......... *H04W 12/03* (2021.01); *H04W 12/041* (2021.01); *H04W 12/043* (2021.01); *H04W 12/062* (2021.01); *H04L 9/08* (2013.01); *H04W 12/06* (2013.01); *H04W 24/02* (2013.01); *H04W 36/0038* (2013.01); *H04W 48/16* (2013.01); *H04W 48/18* (2013.01)

(56) References Cited

U.S. PATENT DOCUMENTS

| | | | |
|---|---|---|---|
| 7,929,504 B2 | 4/2011 | Wentink et al. | |
| 8,582,777 B2 | 11/2013 | Urivskiy et al. | |
| 8,713,317 B2 | 4/2014 | Do et al. | |
| 8,792,646 B2 | 7/2014 | Tinnakornsrisuphap et al. | |
| 9,801,121 B2 * | 10/2017 | Sim | H04W 48/16 |
| 2004/0236939 A1 | 11/2004 | Watanabe et al. | |
| 2007/0121947 A1 * | 5/2007 | Sood | H04W 12/04 380/277 |
| 2007/0147620 A1 | 6/2007 | Zheng et al. | |
| 2008/0022411 A1 | 1/2008 | Wendling et al. | |
| 2009/0034736 A1 * | 2/2009 | French | H04L 63/062 380/278 |
| 2010/0306320 A1 * | 12/2010 | Leppanen | H04W 4/50 709/224 |
| 2011/0188656 A1 | 8/2011 | McCullough | |
| 2012/0129499 A1 | 5/2012 | Li | |
| 2012/0244862 A1 | 9/2012 | Ramankutty et al. | |
| 2013/0095796 A1 | 4/2013 | Cho et al. | |
| 2015/0143126 A1 | 5/2015 | Blom et al. | |
| 2015/0365235 A1 * | 12/2015 | Hostyn | H04W 12/04 713/184 |
| 2016/0191471 A1 | 6/2016 | Ryoo et al. | |
| 2018/0091485 A1 | 3/2018 | Lee et al. | |

FOREIGN PATENT DOCUMENTS

| | | |
|---|---|---|
| CN | 103427992 A | 12/2013 |
| CN | 105557006 A | 5/2016 |
| WO | 2014000610 A1 | 1/2014 |

OTHER PUBLICATIONS

International Preliminary Report on Patentability—PCT/US2017/052979, The International Bureau of WIPO—Geneva, Switzerland, dated Dec. 7, 2018.

International Search Report and Written Opinion—PCT/US2017/052979—ISA/EPO—dated Jan. 3, 2018.

Taiwan Search Report—TW106132564—TIPO—dated Jun. 22, 2021.

Taiwan Search Report—TW110122511—TIPO—dated Aug. 23, 2021.

* cited by examiner

ACCESS STRATUM SECURITY FOR EFFICIENT PACKET PROCESSING

CROSS-REFERENCE TO RELATED APPLICATIONS

This application is a continuation of U.S. application Ser. No. 15/710,991, filed Sep. 21, 2017, which claims benefit of and priority to U.S. Provisional Application No. 62/398,699, filed Sep. 23, 2016, which are assigned to the assignee of the present application and are hereby expressly incorporated by reference herein in their entireties.

INTRODUCTION

Field of the Invention

Aspects of the present disclosure related generally to wireless communications systems, and more particularly, to managing security keys for enciphering and deciphering packets transmitted in a wireless communications system.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of base stations (BSs) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access). NR is a set of enhancements to the LTE mobile standard promulgated by Third Generation Partnership Project (3GPP). NR is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for managing security keys for enciphering and deciphering packets transmitted in a wireless communications system are described herein.

In an aspect, a method for wireless communications is provided. The method may be performed, for example, by a user equipment (UE). The method generally includes obtaining an indication of a key area identifier (ID) of a first cell node, wherein the key area ID identifies a set of cell nodes that are associated with a network node that uses a first key for enciphering or deciphering messages and communicating a first set of messages with the first cell node using the first key for enciphering or deciphering the first set of messages.

In an aspect, a method for wireless communications is provided. The method may be performed, for example, by a user equipment (UE). The method generally includes determining an access node controller (ANC) identifier (ID) associated with a cell node and transmitting a radio resource control (RRC) connection request message comprising the ANC ID, an identifier of the UE, other information, or any combination thereof to the cell node, wherein the other information is encrypted and integrity protected.

In an aspect, a method for wireless communications is provided. The method may be performed, for example, by a user equipment (UE). The method generally includes sending a radio resource control (RRC) connection reestablishment request message to a first cell node, obtaining an indication of a first key area identifier (ID) of the first cell node, wherein the key area ID identifies a set of cell nodes that are associated with a network node that uses a key for enciphering or deciphering messages, obtaining the key associated with the first key area ID, receiving an RRC connection reestablishment message from the first cell node or another network node, and authenticating the RRC connection reestablishment message with the key associated with the first key area ID.

In an aspect, a method for wireless communications is provided. The method may be performed, for example, by a cell node. The method generally includes providing an indication of a key area identifier (ID) of the cell node, wherein the key area ID identifies a set of cell nodes that are associated with a network node that uses a first key for enciphering or deciphering messages and communicating a first set of messages with a user equipment (UE) using the first key for enciphering or deciphering the first set of messages.

In an aspect, a method for wireless communications is provided. The method may be performed, for example, by a transmission and reception point (TRP). The method generally includes obtaining an access node controller (ANC) identifier (ID) associated with cell node, receiving a radio resource control (RRC) connection request message comprising the ANC ID, an identifier of a user equipment (UE), and other information, wherein the other information is encrypted and integrity protected, and authenticating the RRC connection request message.

In an aspect, a method for wireless communications is provided. The method may be performed, for example, by a network node. The method generally includes receiving a radio resource control (RRC) connection reestablishment request message from a user equipment (UE) via a cell node, obtaining a key associated with a first key area identifier (ID) associated with the cell node, wherein the key area ID identifies a set of cell nodes that are associated with the network node that uses a first key for enciphering or deciphering messages, and authenticating the RRC connection reestablishment message with the key.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
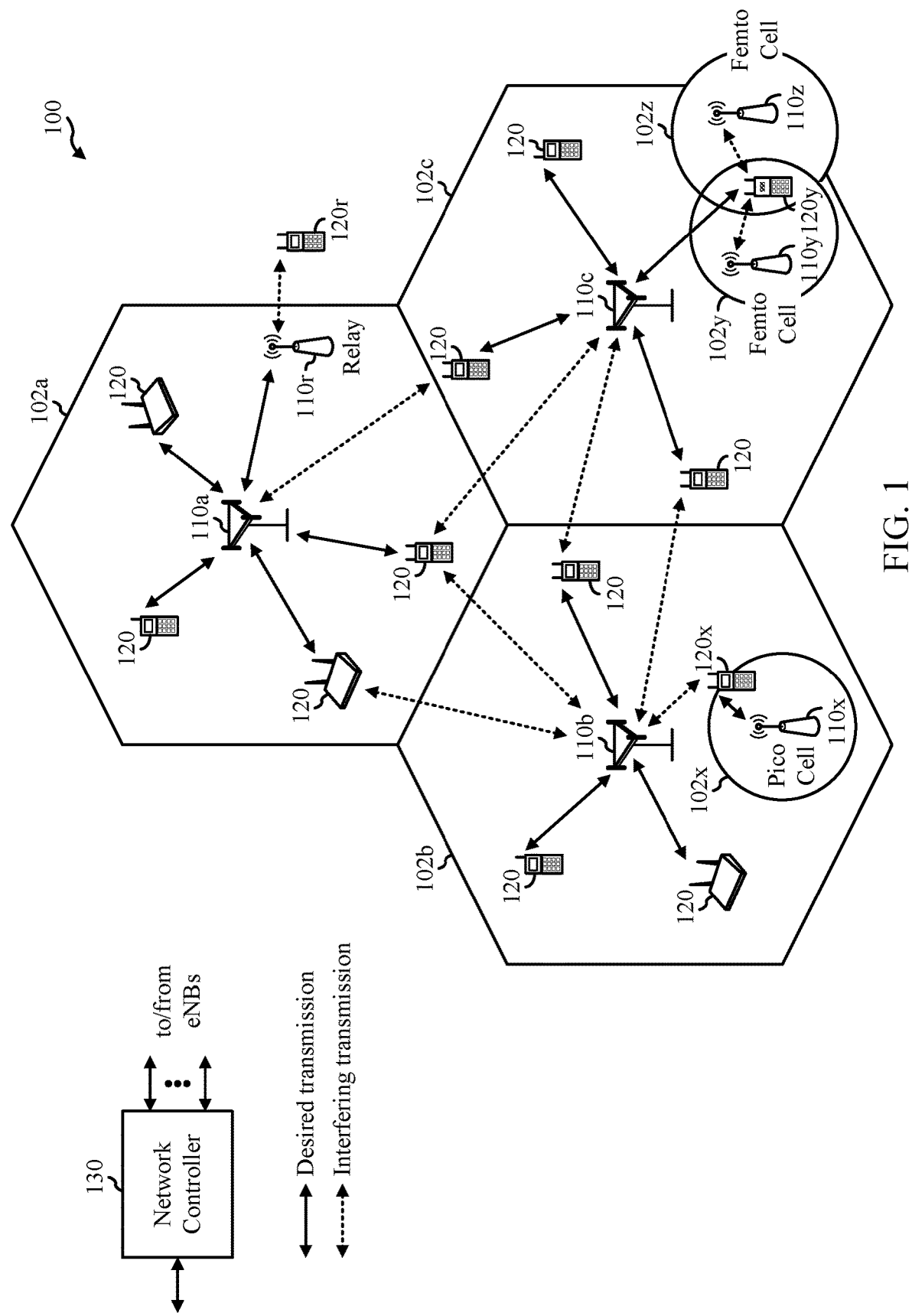
FIG. 1 is a block diagram conceptually illustrating an example telecommunications system, according to aspects of the present disclosure.

Aspects of the present disclosure provide apparatus, methods, processing systems, and computer program products for managing security keys for enciphering and deciphering packets transmitted in a wireless communications system, such as a new radio (NR) system. New radio may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR NodeB (e.g., 5G NodeB) may correspond to one or more transmission and reception points (TRPs). A 5G NodeB may also be referred to as an access node (AN), and may comprise an access node controller (ANC) and one or more TRPs.

A UE may exchange (e.g., transmit and/or receive) packets with a TRP. According to previously known techniques, a UE which disconnects from a TRP and connects to a new TRP derives a new key for enciphering and deciphering packets transmitted to or received from the new TRP. According to aspects of the present disclosure, one or more TRPs may use a common key for enciphering and deciphering packets to or from a UE. Each of the TRPs may provide an indication of a key area identifier (ID) to a UE connecting to a TRP, and the UE may determine that the UE does not need to derive a new key when connecting to a TRP, if the UE has previously been connected to a TRP associated with that key area ID.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio or 5G network. UEs 120 may be configured to perform one or more of the operations 800, 1500, and 1600 (discussed in more detail below with reference to FIGS. 8, 15, and 16), for wirelessly communicating enciphered messages with a cell. BS 110 may comprise a transmission and reception point (TRP) configured to perform one or more of the operations 900, 1700, and 1800 (discussed in more detail below with reference to FIGS. 9, 17, and 18), for wirelessly communicating enciphered messages to the UE 120. The NR network may include a central unit that may be configured, with the UEs 120 and the BS 110, to perform operations related to measurement configuration, measurement reference signal transmission, monitoring, detection, measurement, and measurement reporting.

The system illustrated in FIG. 1 may be, for example, a long term evolution (LTE) network. The wireless network 100 may include a number of BSs (e.g., NodeBs, evolved NodeBs (eNB), 5G NodeBs, access nodes, TRPs, etc.) 110 and other network nodes. A BS may be a station that communicates with the UEs and may also be referred to as a NodeB, an enhanced NodeB (eNodeB), a gateway-station NodeB (gNB), an access point, etc. A NodeB and 5G NodeB (e.g., a transmission and reception point, an access node) are other examples of stations that communicate with the UEs.

Each BS 110 may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscriptions. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro NodeB. A BS for a pico cell may be referred to as a pico NodeB. A BS for a femto cell may be referred to as a femto NodeB or a home NodeB. In the example shown in FIG. 1, the BSs 110a, 110b and 110c may be macro NodeBs for the macro cells 102a, 102b and 102c, respectively. The BS 110x may be a pico NodeB for a pico cell 102x. The BSs 110y and 110z may be femto NodeBs for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110*a* and the UE 120*r*. A relay station may also be referred to as a relay NodeB, a relay, etc.

The wireless network 100 may be a heterogeneous network that includes BSs of different types, e.g., macro NodeBs, pico NodeBs, femto NodeBs, relays, transmission and reception points (TRPs), etc. These different types of BSs may have different transmit power levels, different coverage areas, and different impact on interference in the wireless network 100. For example, macro NodeBs may have a high transmit power level (e.g., 20 Watts) whereas pico NodeBs, femto NodeBs and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro NodeBs, pico NodeBs, femto NodeBs, relays, access nodes, TRPs, etc. In FIG. 1, a solid line with double arrows indicates desired transmissions between a UE and a serving NodeB, which is a NodeB designated to serve the UE on the downlink and/or uplink. A dashed line with double arrows indicates interfering transmissions between a UE and a NodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
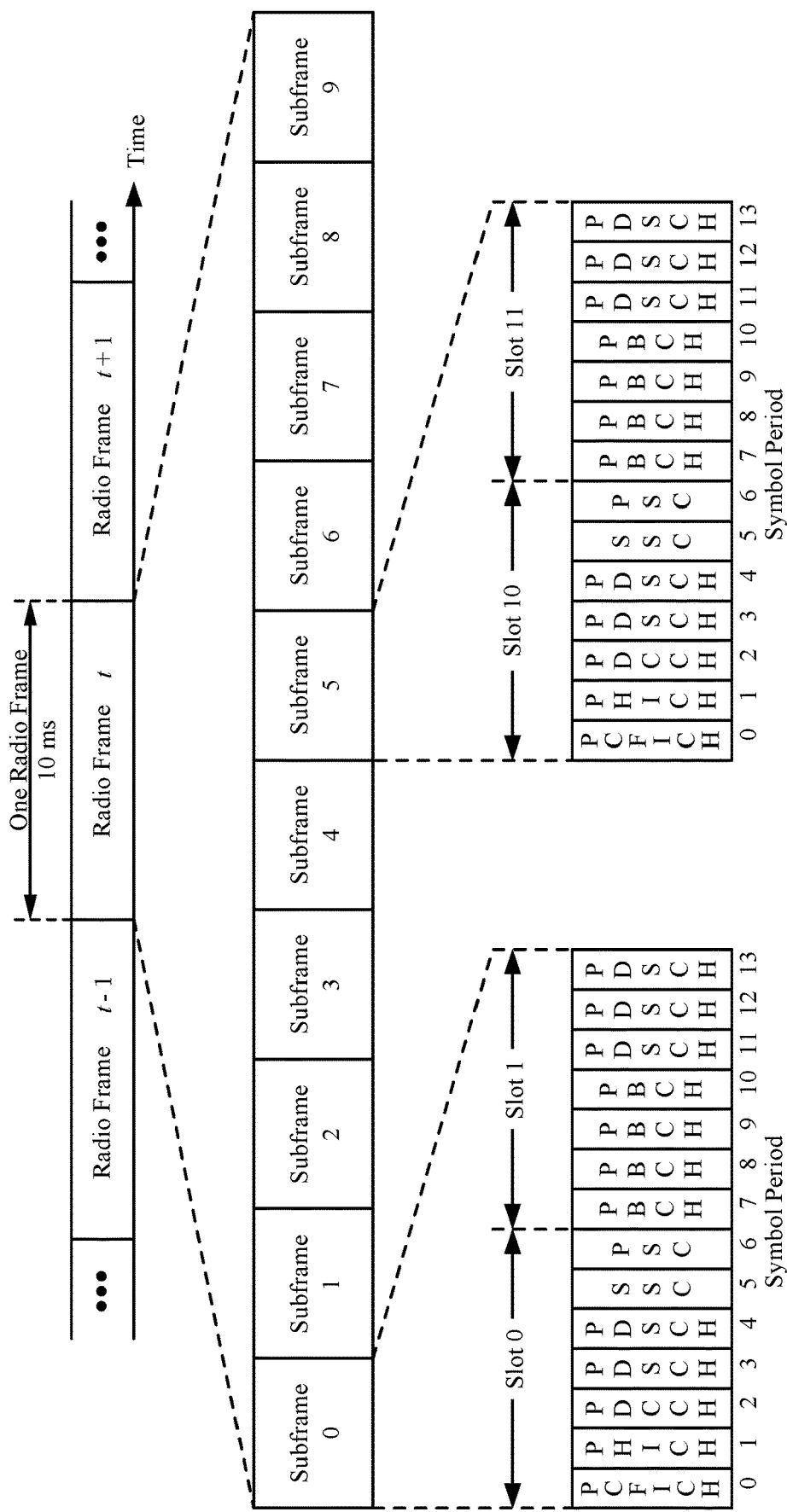
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, a NodeB may send a primary synchronization signal (PSS) and a secondary synchronization signal (SSS) for each cell in the NodeB. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The NodeB may send a Physical Broadcast Channel (PBCH) in symbol periods 0 to 3 in slot 1 of sub-frame 0. The PBCH may carry certain system information.

The NodeB may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The NodeB may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARD). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The NodeB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The NodeB may send the PSS, SSS and PBCH in the center 1.08 MHz of the system bandwidth used by the NodeB. The NodeB may send the PCFICH and PHICH across the entire system bandwidth in each symbol period in which these channels are sent. The NodeB may send the PDCCH to groups of UEs in certain portions of the system bandwidth. The NodeB may send the PDSCH to specific UEs in specific portions of the system bandwidth. The NodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A NodeB may send the PDCCH to the UE in any of the combinations that the UE will search.

A UE may be within the coverage of multiple NodeBs. One of these NodeBs may be selected to serve the UE. The serving NodeB may be selected based on various criteria such as received power, path loss, signal-to-noise ratio (SNR), etc.

Figure 3:
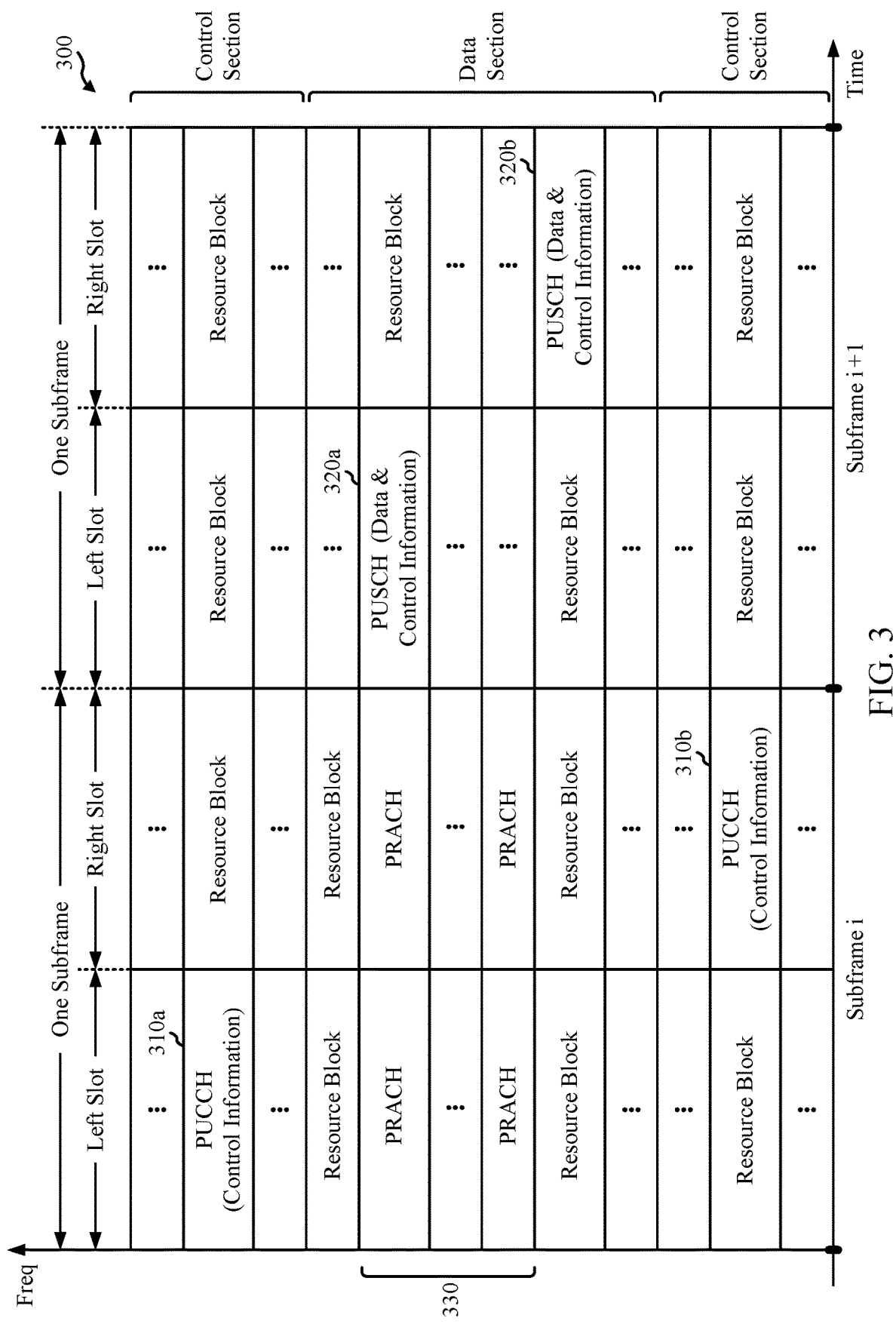
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310*a*, 310*b* in the control section to transmit control information to a NodeB. The UE may also be assigned resource blocks 320*a*, 320*b* in the data section to transmit data to the NodeB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
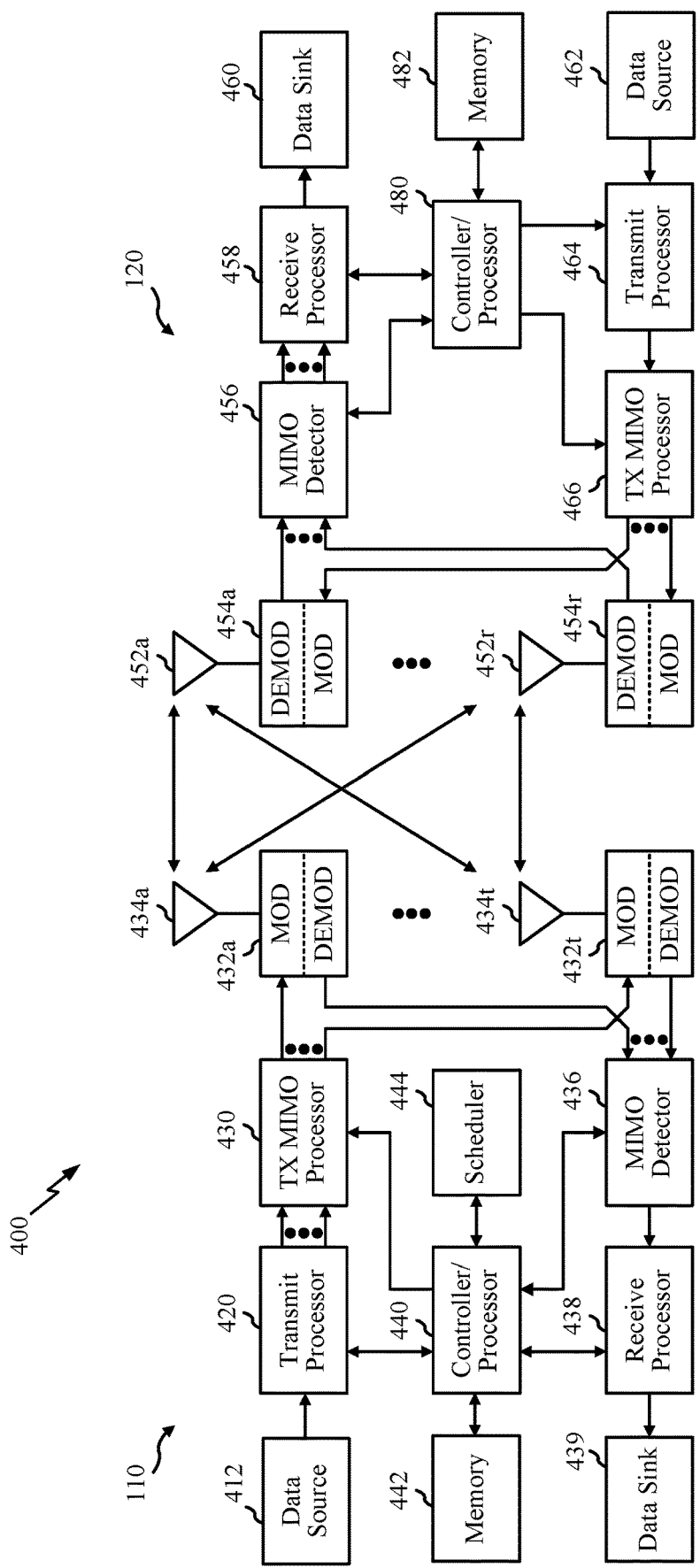
FIG. 4 is a block diagram conceptually illustrating a design of an example base station (BS) and user equipment (UE), according to aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 12-14. The base station 110 may be equipped with antennas 434*a* through 434*t*, and the UE 120 may be equipped with antennas 452*a* through 452*r*.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 12-14, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
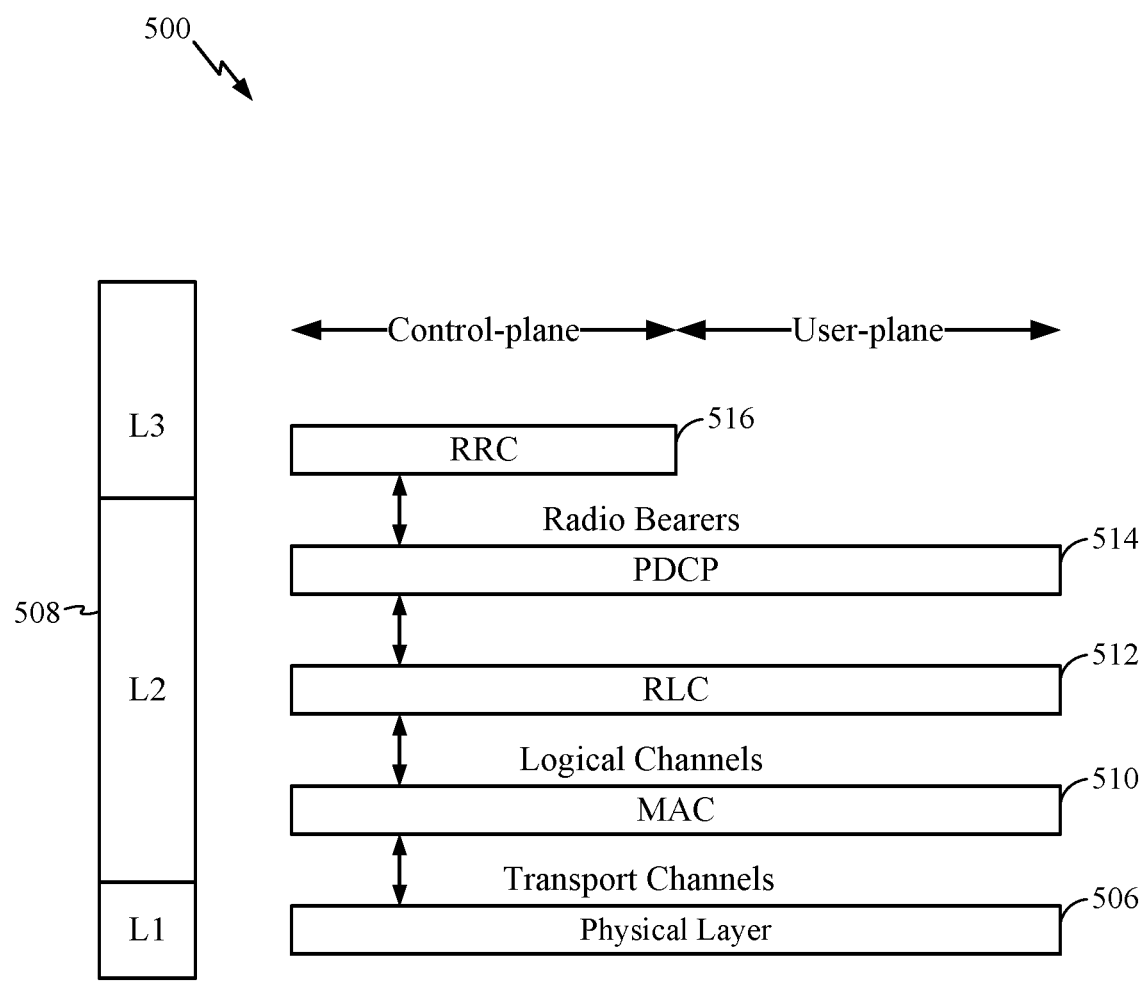
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the BS is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and BS over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the BS on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between BSs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and BS is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the BS and the UE.

A UE may be in one of a plurality of operating states. One of the states may be referred to as an RRC_IDLE state. In the RRC_IDLE state, the UE may not have an active connection to an AN, and the AN does not have a context for the UE.

Another of the operating states may be an inactive state. In the inactive state, there is a UE context in the AN, but no active connection between the UE and the AN. The inactive state may be referred to as "RRC_COMMON," "RRC_I-NACTIVE," "RRC_DORMANT," or as an "inactive state in RRC_CONNECTED mode" and such terms are used interchangeably herein. In the inactive state, the UE does not have any dedicated resources (e.g., time and frequency resources for the UE to transmit on that other UEs are not also transmitting on, time and frequency resources for signals that only the UE is intended to receive). The UE may monitor a paging channel with a long discontinuous reception (DRX) cycle (e.g., around 320 ms to 2560 ms). The UE can receive multimedia broadcast multicast service (MBMS) data while in this state. If the UE obtains data to transmit (e.g., a user activates the UE to start a voice call) to the network (e.g., to a BS or via a BS to another entity), then the UE can perform either a state transition procedure into RRC_CONNECTED mode (e.g., by sending an RRC connection resume message to an AN) or a data transmission procedure that may include contention based access (e.g., performing a contention procedure to access a BS).

Another of the operating states may be an active state. In the active state, there is a UE context in the AN and an active connection between the UE and the AN. In the active state, the UE may have dedicated resources for transmissions to or from the AN and other devices. The active state may be referred to as "RRC_CONNECTED mode," "RRC_CON-NECTED active state," "RRC_DEDICATED," "RRC_AC-TIVE," or "active state in RRC_CONNECTED mode" and such terms are used interchangeably herein. When the AN obtains information that the AN should set up an RRC connection with dedicated resources for the UE (e.g., the AN receives an RRC connection resume request message from the UE, the AN obtains data to be transmitted to the UE), then the AN may send a transmission (e.g., a page) to the UE to cause the UE to transition to the active state. When the AN acknowledges the RRC connection resume request message, then the UE may enter the active state.

Figure 6:
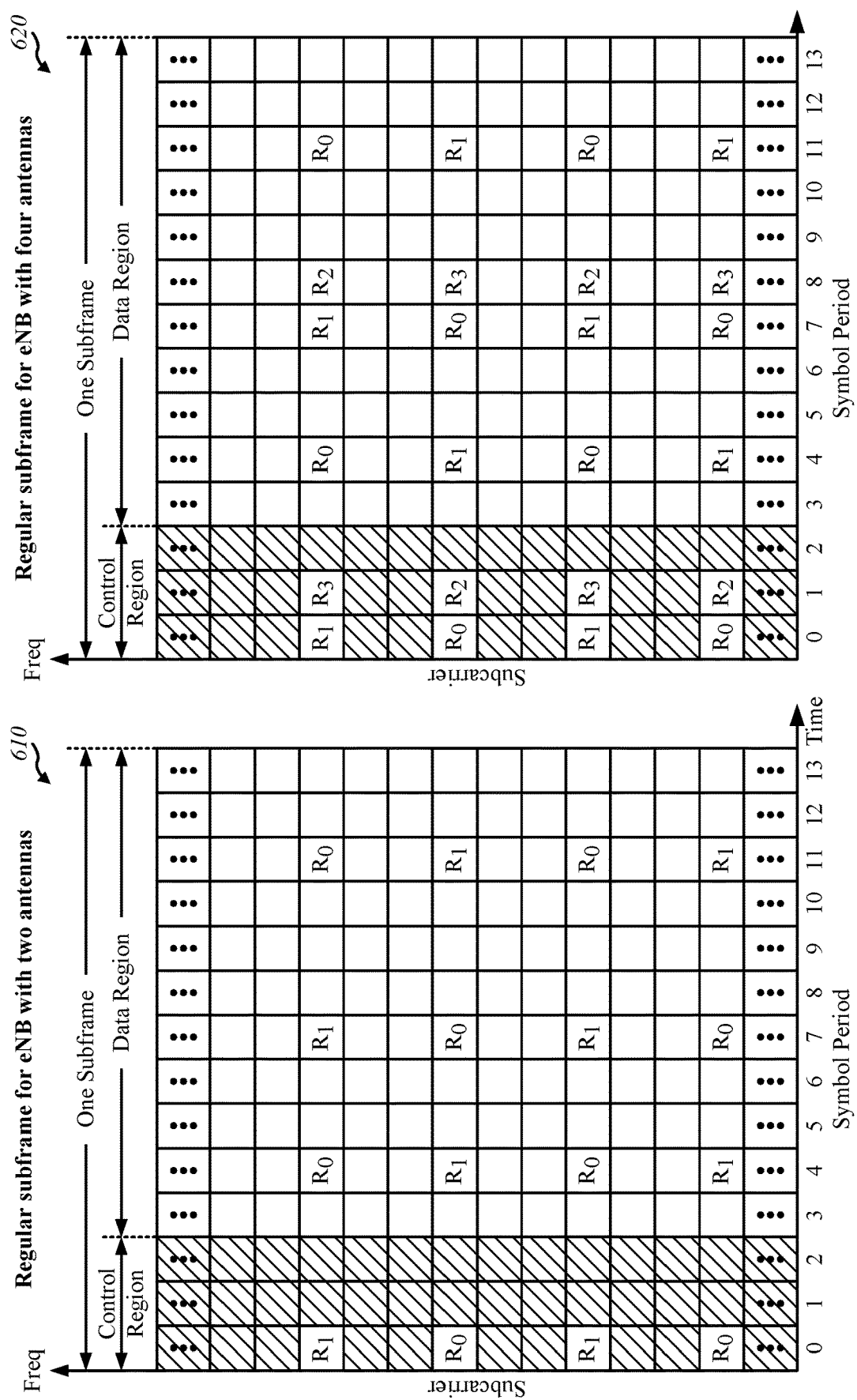
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a BS equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a BS equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different BSs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

New radio (NR) may refer to radios configured to operate according a wireless standard, such as 5G (e.g. wireless network 100). NR may include enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC).

NR cell may refer to a cell operating according in the NR network. A NR BS (e.g., BS 110) may correspond to one or multiple transmission and reception points (TRPs). As used herein, a cell may refer to a combination of downlink (and potentially also uplink) resources. The linking between the carrier frequency of the downlink resources and the carrier frequency of the uplink resources may be indicated in system information (SI) transmitted on the downlink resources. For example, system information can be transmitted in a physical broadcast channel (PBCH) carrying a master information block (MIB).

NR RAN architecture may include a central unit (CU). The CU may be an access node controller (ANC). The CU may terminate a backhaul interface to a radio access network core network (RAN-CN) and/or terminate a backhaul interface to a neighbor RAN node. The RAN may include a distributed unit that may be one or more TRPs that may be connected to one or more ANCs. TRPs may advertise System Information (e.g., Global TRP ID), may include PDCP/RLC/MAC functions, may comprise one or more antenna ports, may be configured to individually (dynamic selection) or jointly (joint transmission) transmit signals, and may serve traffic to the UE.

Wireless standards, such as 5G, may include latency and reliability requirements. Latency in a network may refer to the amount of time required for a packet of data to get from one point in the network to another point in the network. For example, latency in the user plane may be defined based on the time required for a successful delivery of an application layer packet from a layer 2 or 3 medium access control (MAC) service data unit (SDU) ingress point to a layer 2 or 3 MAC SDU egress point through a radio interface. Average latency for URLLC may target 0.5 ms for UL and 0.5 ms for DL in the user plane for certain standards. Average latency for eMBB may target 4 ms for UL and DL and for mMTC, latency may be no worse than 10 seconds on UL for a 20 byte application packet (105 bytes at the PHY layer with uncompressed IP headers) at 164 dB minimum coupling loss (MCL).

A wireless standard may include a reliability requirement separate from the latency requirement. Reliability in a network may refer to a probability of successfully transmitting X number of bytes within 1 ms, where 1 ms is the time to deliver a small packet from a protocol layer 2 or 3 SDU ingress point to an egress point, at a certain channel quality. For example, reliability for URLLC may be $1 \times 10^{-5}$ within 1 ms for X number of bytes (e.g., 20 bytes), with a user latency of 1 ms. As another example, enhanced vehicle-to-X (eV2X) may require reliability of $1 \times 10^{-5}$ for 300 bytes within 1 ms. Additionally user plane latency of 3-10 ms for direct communications via a sidelink and communication range of, for example, a few meters, along with user plane latency of 2 ms when a packet is relayed via a BS may be required.

To achieve $1 \times 10^{-5}$ reliability within 1 ms along with the target 0.5 ms latency for URLLC services, interference from other URLLC users as well as other services, such as eMBB users, should be minimized. For DL, given the target latency requirement, a URLLC transmission may need to puncture another lower priority transmission. As DL is controlled by a NodeB, the NodeB can schedule the URLLC transmission over and puncture lower priority transmission, such as one by an eMBB user and rely on outer code or other mechanisms to minimize impact to eMBB users. For UL, all UL assignments are scheduled well in advance and cannot be punctured on the fly. For example, a lower priority transmission, such as eMBB, may be transmitting from a first UE. If a second UE attempts to transmit a URLLC transmission during time the first UE is transmitting, the two transmissions may collide and result in interference. Accordingly, techniques allowing for co-existence of reliable low-latency services with other services in a wireless network are desirable.

Example Access Stratum Security for Efficient Packet Processing

As mentioned above and described in more detail below, aspects of the present disclosure provide techniques for managing security keys for enciphering and deciphering packets transmitted in a wireless communications system, such as a new radio (NR) (e.g., 5G) system.

A UE may exchange (e.g., transmit and/or receive) packets with a cell node. A cell node may comprise a base station, a distributed unit (DU) and/or other network equipment that supports a cell, such as cells 102a, 102b, 102c, 102x, 102y, and 102z (shown in FIG. 1). As used herein "cell node" and "cell entity" are synonymous, and both refer to network equipment that supports a cell. A cell node may comprise one or more TRPs. According to previously known techniques, a UE which disconnects from a cell node and connects to a new cell node derives a new key for enciphering and deciphering packets transmitted to or received from the new cell node. According to aspects of the present disclosure, one or more cell nodes may use a common key for enciphering and deciphering packets to or from a UE. Each of the cell nodes may provide an indication of a key area identifier (ID) to a UE connecting to a cell node, and the UE may determine that the UE does not need to derive a new key when connecting to a cell node, if the UE has previously been connected to a cell node associated with that key area ID.

Figure 7:
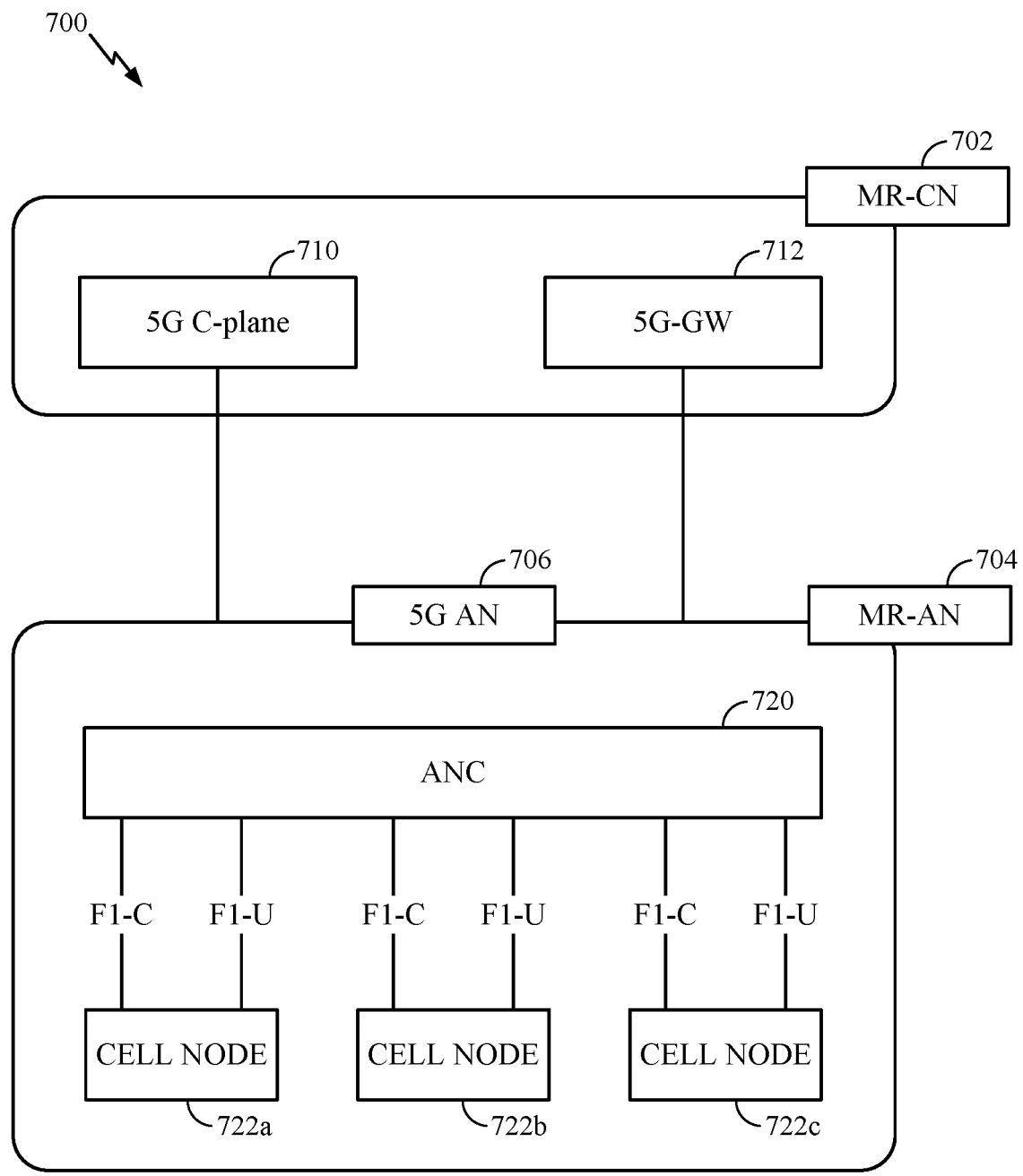
FIG. 7 illustrates an exemplary logical architecture of a 5G radio access network, according to previously known techniques.

FIG. 7 illustrates an exemplary logical architecture 700 of a 5G radio access network. The exemplary architecture includes a multi-RAT core network (MR-CN) 702 and a multi-RAT access network (MR-AN) 704. While the MR-CN is shown with a single MR-AN, the disclosure is not so limited and an MR-CN may include more MR-ANs, as well as single-RAT access networks. The MR-CN includes a 5G control plane (C-plane) function 710 and a 5G gateway (GW) 712. The 5G control plane may manage connections of the various UEs and other entities connecting to the RAN. The 5G gateway may enable and manage connections to other networks (e.g., the Internet). The MR-AN includes a 5G access network (AN) 706 that includes an access node controller (ANC) 720 that is connected with a plurality of cell nodes 722a, 722b, and 722c. While the MR-AN is shown with a single 5G AN, the disclosure is not so limited and an MR-AN may include multiple 5G ANs, as well as ANs of other technologies. Control messages to and from the 5G AN may travel from and to the C-plane function, while data to and from the 5G AN may travel to and from the 5G-GW. The ANC terminates a backhaul interface to the MR-CN via an NG1 control (NG1-C) interface and/or an NG1 user (NG1-U) interface. The ANC also terminates a backhaul interface to neighbor MR-ANs, via an XN2 user (XN2-U) interface and/or an XN2 control (XN2-C) interface.

Cell nodes may be distributed over a geographical area, and each cell node may serve one or more cells. While not shown in FIG. 7, a cell node may be connected to one or more ANCs (e.g. for RAN sharing, radio resources as a service (RaaS), and service specific ANC deployments). Also, an ANC (e.g., a network node) may be connected with only a single cell node in some cases. A cell node may advertise system information (e.g., a cell global ID (CGI)) and may include PDCP, RLC, and/or MAC functions. A cell node may comprise one or more antenna ports. A cell node may be configured to individually (dynamic selection) or jointly (joint transmission) serve traffic to a UE. As illustrated, an ANC may communicate with a cell node via an F1 control interface (F1-C) and an F1 user interface (F1-U).

Aspects of the present disclosure may enable efficient packet processing in terms of security (i.e., ciphering/integrity protection) upon a cell change (e.g., cell node change) by a UE in connected mode (i.e., RRC_DEDICATED).

According to aspects of the present disclosure, a UE may perform adaptive key derivation based on various AN configurations. According to some aspects of the present disclosure, a PDCP may be located or implemented on one end at an ANC (e.g., forming one end of a PDCP layer between the ANC and a UE) or network node, and UEs may not require an AS key change upon changing a cell, resulting in both the UE and network entities (e.g., ANC, network node, and/or cell node) not reciphering (e.g., due to a key change) buffered packets.

According to some aspects of the present disclosure, a PDCP may be terminated on one end at a cell node, and UEs may require an AS key change upon changing a cell, thus allowing for key separation between cell nodes, but also resulting in both the UE and network entities (e.g., ANC and/or cell node) reciphering (e.g., due to the key change) buffered packets.

According to some aspects of the present disclosure, an AN (e.g., a network node) configuration may be a combination of the above described configurations, with multiple data radio bearers (DRBs) terminated at different PDCP anchors (e.g., some terminated at an ANC or network node and others terminated at a cell node).

Aspects of the present disclosure may enable flexible security configuration for diverse AN deployment scenarios. Some configurations may be more suitable for a small AN (e.g., with a single cell node), while other configurations may be more suitable to a big AN (e.g., with ~1M cell nodes).

Aspects of the present disclosure may enable efficient packet processing during radio link failure (RLF). After a RLF, a UE may reselect to a cell that does not require a key change to reduce any packet processing overhead. If cell reselection does not trigger a key change, then buffered packets (e.g., at the UE, the ANC, a network node, and/or the cell node) do not need to be deciphered (using the key used to encipher the packets before they were buffered) and then reciphered using a new key.

According to aspects of the present disclosure, cell nodes may belong to a key area within which no new key derivation is required during cell/TRP changes by a UE in connected (e.g., RRC_DEDICATED) mode. A key area may be identified by a key area ID that may be broadcast by a cell node (e.g., in a system information block (SIB)) or otherwise provided to UEs communicating with the cell node. According to aspects of the present disclosure, new key derivation within the key area is needed only when RRC state change (e.g., inactive state to active state, RRC_COMMON to RRC_DEDICATED) for a UE occurs.

According to aspects of the present disclosure, an indication of a key area ID that a UE may obtain may comprise a list of identifiers of cell nodes that are associated with a network node (e.g., an ANC) that uses the common key associated with the key area ID for enciphering and deciphering packets. The ANC or network node may provide the list of identifiers to the UE using RRC signaling. For example, a UE (e.g., UE 120 shown in FIGS. 1 and 4) may exchange packets with a first cell node (e.g., one of the cell nodes shown in FIG. 7). In the example, the UE may receive, using RRC signaling with the ANC, a list of identifiers of the first cell node, a second cell node (e.g., one of the other cell nodes in FIG. 7), and other cell nodes that can use a common key (associated with a key area ID) for enciphering and deciphering packets. Still in the example, the UE may disconnect from the first cell node and connect with the second cell node. Continuing the example, the UE may receive an identifier of the second cell node from the second cell node, and the UE may determine that the UE does not need to derive a new key when connecting with the second cell node because the identifier of the second cell node was included in the list of identifiers that the UE received from the ANC.

In aspects of the present disclosure, a list of identifiers of cell nodes may be transmitted by an ANC or network node via a cell node via an RRC signal, and the list of identifiers may be obtained by a UE from the RRC signal.

According to aspects of the present disclosure, a list of identifiers of cell nodes that are associated with a network node (e.g., that uses the common key associated with the key area ID) may comprise a list of physical cell identifiers (PCIs) that are associated with the cell nodes associated with the network node.

According to aspects of the present disclosure, a list of identifiers of cell nodes that are associated with a network node (e.g., that uses the common key associated with the key area ID) may comprise a list of cell global identifiers (CGIs) that are associated with cell nodes associated with the network node.

According to aspects of the present disclosure, a list of identifiers of cell nodes that are associated with a network node (e.g., that uses the common key associated with the key area ID) may comprise a list of E-UTRAN cell identifiers (ECIs) that are associated with cell nodes associated with the network node.

According to aspects of the present disclosure, key derivation is decoupled from a physical entity (e.g., RAT specific parameters such as physical cell ID (PCI) and EUTRA absolute radio frequency channel number for downlink (EARFCN-DL) in LTE). Decoupling key derivation from physical entity identifiers may support both adaptive key derivation and flexible security configuration, e.g., based on the key area ID.

Figure 8:
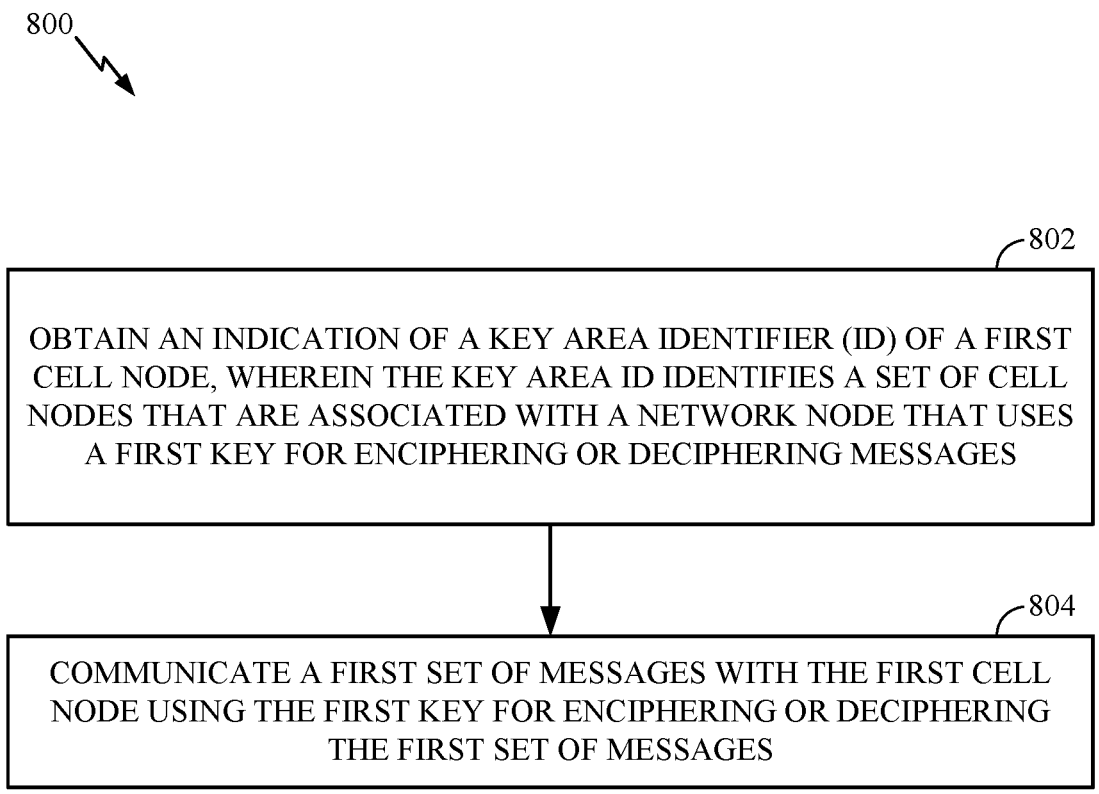
FIG. 8 illustrates example operations for wireless communications by a user equipment (UE), according to aspects of the present disclosure.

FIG. 8 illustrates example operations 800 for wireless communications by a user equipment (UE), according to aspects of the present disclosure. The operations 800 may be performed, for example, by UE 120, shown in FIG. 1.

Operations 800 may begin at 802 by the UE obtaining an indication of a key area identifier (ID) of a first cell node, wherein the key area ID identifies a set of cell nodes that are associated with a network node that uses a first key for enciphering or deciphering messages. For example, UE 120 (shown in FIG. 1) may obtain an indication of a key area ID of a first cell node, which may be part of BS 110. In the example, the key area ID may identify a set of TRPs associated with a network node (e.g., an ANC) that uses a first key for enciphering or deciphering messages.

At 804, the UE communicates a first set of messages with the first cell node using the first key for enciphering or deciphering the first set of messages. Continuing the example from above, the UE may encipher some messages using the first key and transmit the enciphered messages to the cell node. Still in the example, the UE may also decipher some messages received from the cell node using the first key.

Figure 9:
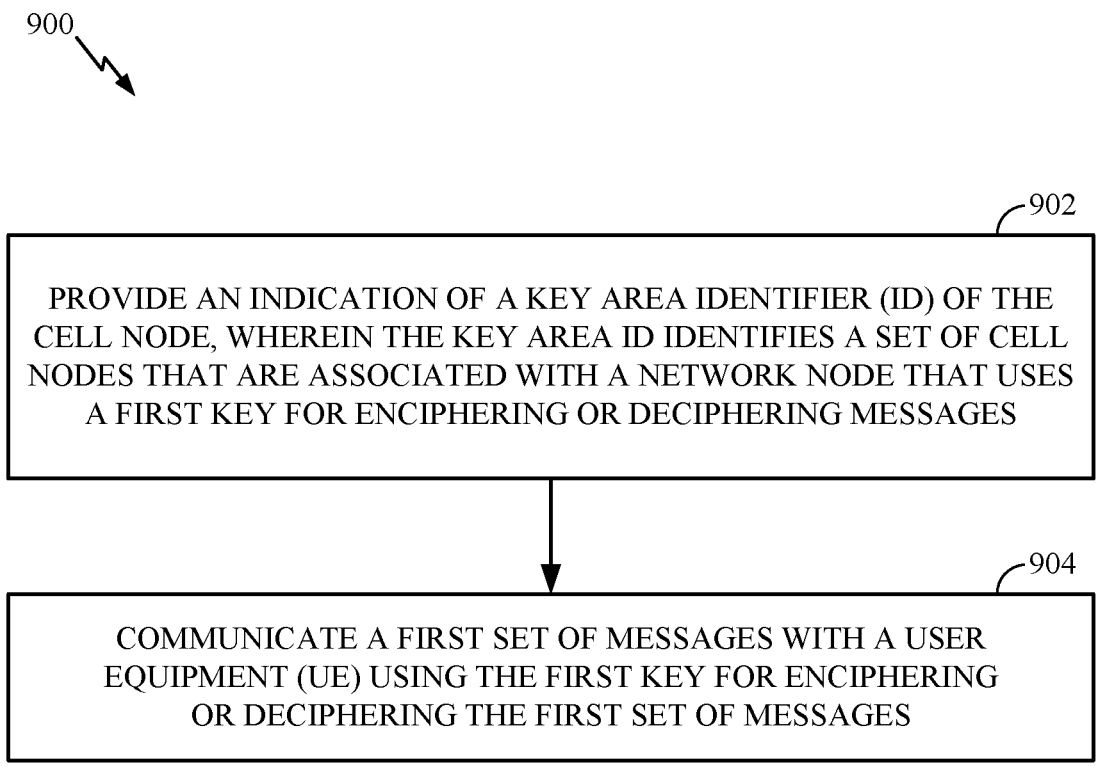
FIG. 9 illustrates example operations for wireless communications by a wireless node, according to aspects of the present disclosure.

FIG. 9 illustrates example operations 900 for wireless communications by a wireless node, according to aspects of the present disclosure. The operations 900 may be performed by a cell node or a base station, for example, BS 110, shown in FIG. 1, and may be considered complementary to the operations 800 shown in FIG. 8.

Operations 900 may begin at 902 by the cell node providing an indication of a key area identifier (ID) of the cell node, wherein the key area ID identifies a set of cell nodes that are associated with a network node that uses a first key for enciphering or deciphering messages. For example, a cell node, which may be part of BS 110 (shown in FIG. 1), may transmit an indication of a key area ID of the cell node. In the example, the key area ID may identify a set of cell nodes associated with a network node (e.g., an ANC) that uses a first key for enciphering or deciphering messages.

At 904, the cell node communicates a first set of messages with a UE using the first key for enciphering or deciphering the first set of messages. Continuing the example from above, the cell node may encipher some messages using the first key and transmit the enciphered messages to a UE 120 (shown in FIG. 1). Still in the example, the cell node may also decipher some messages received from the UE using the first key.

According to aspects of the present disclosure and as mentioned previously, an indication of a key area ID that a UE may obtain may comprise a list of identifiers of cell nodes and/or BSs that are associated with a network node (e.g. an ANC) that uses the common key associated with the key area ID for enciphering and deciphering packets. Thus, the indication of a key area ID in FIGS. 8-9 may be a list of identifiers of cell nodes and/or BSs.

In aspects of the present disclosure, a list of identifiers of cell nodes may be transmitted by a cell node via an RRC signal, and the list of identifiers may be obtained by a UE from the RRC signal.

According to aspects of the present disclosure, a list of identifiers of cell nodes that are associated with a network node (e.g., that uses the common key associated with the key area ID) may comprise a list of physical cell identifiers (PCIs) that are associated with the cell nodes.

According to aspects of the present disclosure, a list of identifiers of cell nodes that are associated with a network node (e.g., that uses the common key associated with the key area ID) may comprise a list of cell global identifiers (CGIs) that are associated with the cell nodes.

According to aspects of the present disclosure, a list of identifiers of cell nodes that are associated with a network node (e.g., that uses the common key associated with the key area ID) may comprise a list of E-UTRAN cell identifiers (ECIs) that are associated with the cell nodes.

According to aspects of the present disclosure, a UE may decide to reestablish a connection using an RRC connection reestablishment procedure (e.g., due to RLF or a forward handover (HO)). The UE may connect to either a last serving cell node (i.e., the cell node that most recently served the UE) or a new cell node. If the UE connects to a cell node advertising a same key area ID as the last serving cell node, then message(s) may be sent securely using a key associated with the key area ID, and no new access node key ($K_{AN}$) or eNodeB key ($K_{eNB}$) is needed, i.e., without deriving a new access stratum (AS) key.

According to some aspects of the present disclosure, an ANC or network node can indicate whether a new key (e.g., $K_{eNB}$) is to be derived from the old key and used for ciphering and deciphering messages by sending a counter in a response message, i.e., the network can decide to change the key in situations that would not otherwise require changing a network key.

According to aspects of the present disclosure, buffered messages that have already been ciphered don't need to be reciphered due to key changes, if a UE connects to a cell node which advertises a same key area ID as a cell node that the UE was previously connected to. This may be useful in case of frequent handovers within an ANC or network node (e.g., a UE traveling near several mmW cells controlled from a same ANC).

According to some aspects of the present disclosure, a network node (e.g., an ANC) may require a UE that is connecting to change to a new key to cipher and decipher packets which have not yet been ciphered or deciphered, but keep the old key temporarily available for deciphering previously ciphered packets received from a cell node. In addition, the network node may make the old key available for deciphering packets that the UE ciphered before the UE received the new key. By making the old key available, the network (e.g., an ANC, a network node, and/or a cell node) may avoid reciphering packets and causing a UE to recipher packets.

According to previously known technologies (e.g., LTE), for RLF recovery (e.g., reconnection after RLF), a UE sends an RRC reconnection request messages in clear (e.g., not ciphered), as the UE needs to find a context at either an old (e.g., previously connected to) eNB or a new eNB. In some previously known techniques, a source eNB and a UE each create a short message authentication code—integrity (MAC-I) (or token) to prove to the target eNB that the UE is the correct UE. That is, the UE presents the short MAC-I to the target eNB when the UE connects, and the target eNB verifies the UE by comparing the presented short MAC-I with a short MAC-I provided by the source eNB.

According to aspects of the present disclosure, a UE attempting RLF recovery may send an RRC connection reestablishment request encrypted and integrity protected. The UE may include a source ANC ID and a UE ID in the RRC reconnection request in unencrypted form. Other portions of the RRC connection reestablishment request may be encrypted with the key known to the UE and the source ANC.

According to aspects of the present disclosure, a UE may determine an access node key ($K_{AN}$) based on a key area ID advertised by a cell node when the UE is reestablishing a connection using an RRC connection reestablishment procedure. The UE may have decided to move from an inactive state to an active state or from RRC_COMMON (or RRC_INACTIVE) state to RRC_DEDICATED (or RRC_CONNECTED) state. The UE may connect to either the last serving cell node or a new cell node. If the UE is connected to a cell node advertising a same key area ID, then messages (e.g., RRC connection reestablishment messages) can be sent securely and a new $K_{AN}$ may be derived (by the UE and a cell node) based on a previous $K_{AN}$ established during the previous RRC_DEDICATED session with the AN. The AN may verify the message by deriving a new $K_{AN}$ based on the previous $K_{AN}$, as in the UE.

According to aspects of the present disclosure, if the UE connects to a cell node advertising a new key area ID, then messages can be sent securely with a new $K_{AN}^*$ derived by the UE. If it is a new ANC, the new ANC may pull the context from the old ANC, including the new $K_{AN}^*$, which the new ANC may use to authenticate RRC messages from the UE.

According to aspects of the present disclosure, a UE performing an inactive state to active state transition (e.g., an RRC_COMMON to RRC_DEDICATED transition) may derive a new key. In some aspects of the present disclosure, the UE protects (e.g., encrypts) the RRC message(s) using the new key. In some aspects of the present disclosure, the UE protects the RRC message(s) using the old key and uses the new key to protect messages to a TRP after the inactive state to active state (e.g., RRC_COMMON to RRC_DEDICATED) transition is complete.

Figures 10A, 10B, 10C:
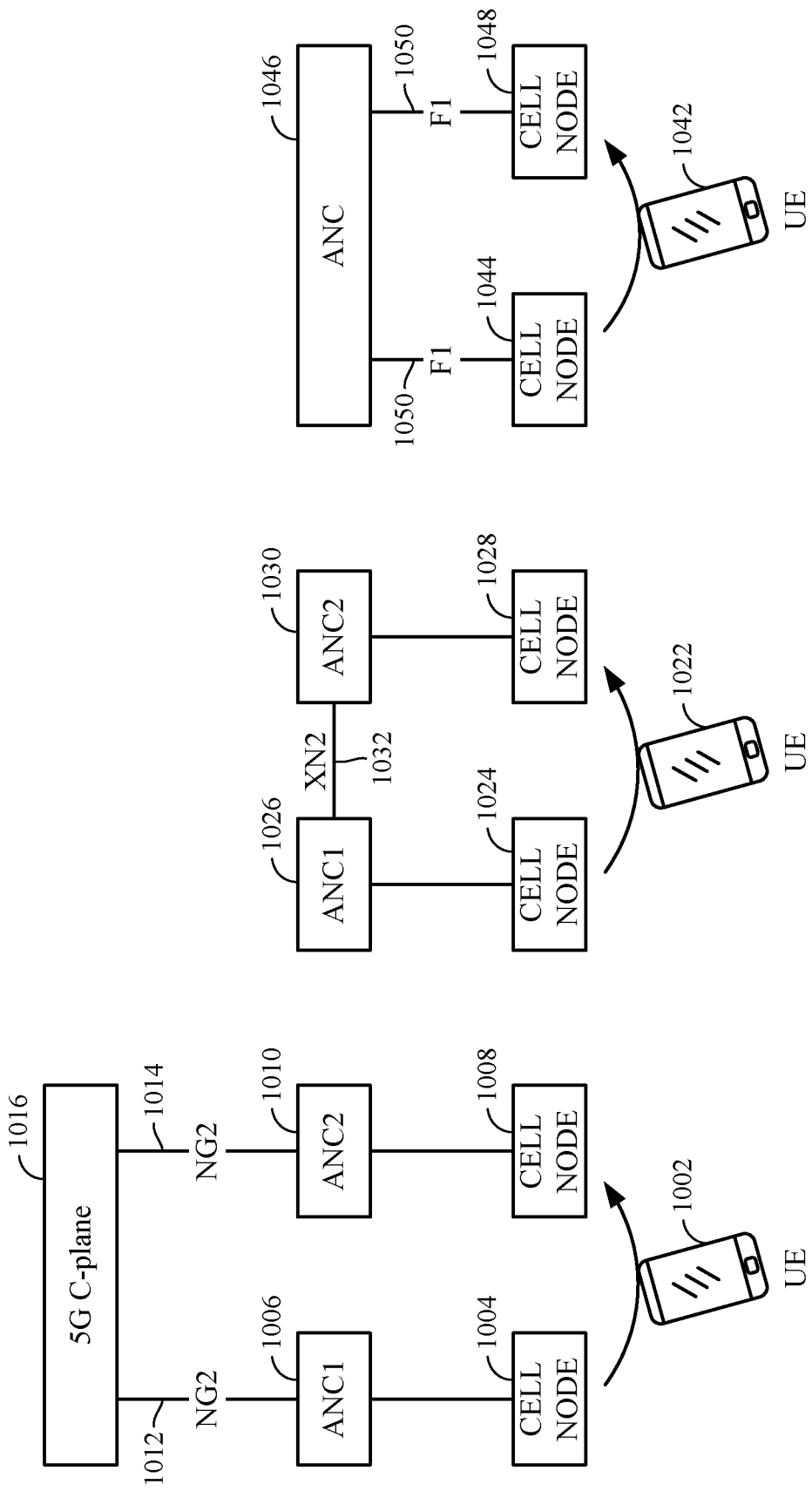
FIGS. 10A-10C illustrate exemplary UE mobility operations, according to aspects of the present disclosure.

FIGS. 10A-10C illustrate exemplary UE mobility operations, according to aspects of the present disclosure.

FIG. 10A illustrates inter-RAT or intra-RAT mobility via an NG2 interface. As illustrated, a UE 1002 is moving from a first cell node 1004 associated with a first ANC 1006 to a second cell node 1008 associated with a second ANC 1010. The move is coordinated via NG2 interfaces 1012, 1014 using the 5G control plane function 1016. Coordinating the move may include determining a context for the UE from the UE's connection to the first cell node and making that context available to the second ANC and second cell node. While illustrated as an intra-RAT move, similar procedures are followed for mobility to other RATs, including mobility to LTE legacy via an "enhanced" or "interworking" MME and/or SGW (e.g., an eMME, an eSGW). This type of mobility may be considered to be an extension of S1 mobility in LTE across RATs. Security procedures may be similar to security procedures for an S1 based handover in a 4G network. This type of mobility is similar to XN2 based mobility, described below with reference to FIG. 10B, with the core network control plane being involved.

FIG. 10B illustrates inter-RAT or intra-RAT mobility via an XN2 interface. As illustrated, a UE 1022 is moving from a first cell node 1024 associated with a first ANC 1026 to a second cell node 1028 associated with a second ANC 1030. The move is coordinated via an XN2 interface 1032 between the first ANC and the second ANC. As above, coordinating the move may include determining a context for the UE from the UE's connection to the first cell node and making that context available to the second ANC and second cell node. This type of mobility may be considered to be an extension of X2 mobility in LTE across RATs. Security procedures may be similar to the security procedures for an X2 based handover in a 4G network.

FIG. 10C illustrates intra-ANC mobility via an F1 interface. As illustrated, a UE 1042 is moving from a first cell node 1044 associated with an ANC 1046 to a second cell node 1048 associated with the same ANC. The move is coordinated via F1 interfaces 1050 between the TRPs and the ANC. Such a move may be transparent to the core network (CN).

According to aspects of the present disclosure, security procedures for intra-ANC mobility, as illustrated in FIG. 10C, may be similar to the security procedure for an intra-eNB handover in a 4G network. The UE and network may derive a new key without incorporating a PCI and an EARFCN-DL in the key derivation, unlike an intra-eNB handover in a 4G network. The UE and the network may include a counter parameter, maintained by the network, in key derivation, as a means of enabling changes to the key from one derivation to a next derivation.

Additionally or alternatively, security procedures for intra-ANC mobility, as illustrated in FIG. 10C, may not require a key change within a key area. According to aspects of the present disclosure, if a key area consists of multiple cell nodes, then a same $K_{AN}$ (equivalent to $K_{eNB}$ in 4G) may be used by the multiple cell nodes. If a same $K_{AN}$ is used by multiple cell nodes, then the PDCP layer of communications with a UE may be terminated in a network node (e.g., an ANC) controlling the cell nodes. If a key area consists of a single cell node, then the PDCP layer can terminate in the cell node or in the network node.

Additionally or alternatively, the two procedures described above may be combined, with new key derivation for a move within a key area required when the network (e.g., a network node in the network) increments the counter, i.e., a network triggered key change or refresh.

According to aspects of the present disclosure, key areas may be used for determining keys during connected mode mobility. Key areas, as described herein, are a RAN-only concept under a network node (e.g., an ANC), i.e., key areas are transparent to the core network.

According to aspects of the present disclosure, a key area comprises one or more cell nodes that coordinate for improved mobility for UEs. A key area may be identified by a key area (KA) ID.

According to aspects of the present disclosure, when a UE is performing inter-key area mobility, i.e., moving from a first cell node in a first key area to a second cell node in a second key area, the UE and the network (e.g., a network node) derive a new $K_{AN}$ based on a current $K_{AN}$ (e.g., used for communications between the UE and the first cell node) and a counter. The new $K_{AN}$ may also be derived based on the key area ID (KAID) of the second cell node and other parameters, i.e., as shown in the equation below:

$$K_{AN}*=KDF(K_{AN},[COUNTER],[KAID],OPT)$$

where $K_{AN}*$ is the new key, KDF is the key derivation function, $K_{AN}$ is the current key, [COUNTER] is a counter maintained by the network that may be used to trigger key changes (and is enclosed in brackets to show it is optional), [KAID] is the identifier of the key area (also in brackets to show it is optional), and OPT stands for other optional parameters, such as random numbers exchanged between a UE and a cell node during a random access procedure.

According to aspects of the present disclosure, KAID is used to inform a UE of a need to derive a new key and may have no physical topology implication.

According to aspects of the present disclosure, COUNTER may be an eight-bit counter that is used for intra-key area key refresh. COUNTER may be used to ensure synchronization between a UE and a network node (e.g., an AN). For example, if a UE has an active connection in a key area and receives packets that the UE cannot decipher using a current key, then the UE may determine that the AN has changed COUNTER. If the UE obtains a new value of COUNTER that differs significantly (e.g., more than an increment of one) from the value of COUNTER that the UE previously had, then the UE may determine that the UE did not receive multiple packets sent via the connection. The UE may also determine that synchronization of the connection has been lost.

According to aspects of the present disclosure, a UE and/or a network node (e.g., an AN) may use COUNTER to identify that a "replay attack" is occurring. In a replay attack, an entity that is eavesdropping on a connection may send another copy of overheard transmissions to one of the entities in the connection in order to interfere with the connection and/or take over the connection. In aspects of the present disclosure, a network node (e.g., an AN) may change COUNTER and inform a UE of the new value of COUNTER. The network node and/or the UE may receive transmissions of a replay attack that use the cipher associated with the old value of COUNTER, determine that the old value of COUNTER was used, and determine based on that determination that a replay attack is occurring or has occurred.

According to aspects of the present disclosure, because no physical RAT specific parameters are used for key derivation, flexible key area re-definition based on security requirements may be possible.

According to aspects of the present disclosure, when a UE is performing intra-key area mobility, i.e., moving from a first cell node in a key area to a second cell node in the same key area, the UE and the network (e.g., network node) do not derive a new $K_{AN}$. By not deriving a new key for moves within a key area, frequent key derivation and the corresponding delay and overhead caused by frequent key derivation may be avoided in some situations, such as frequent handovers between mmW cells that may occur.

Figure 11:
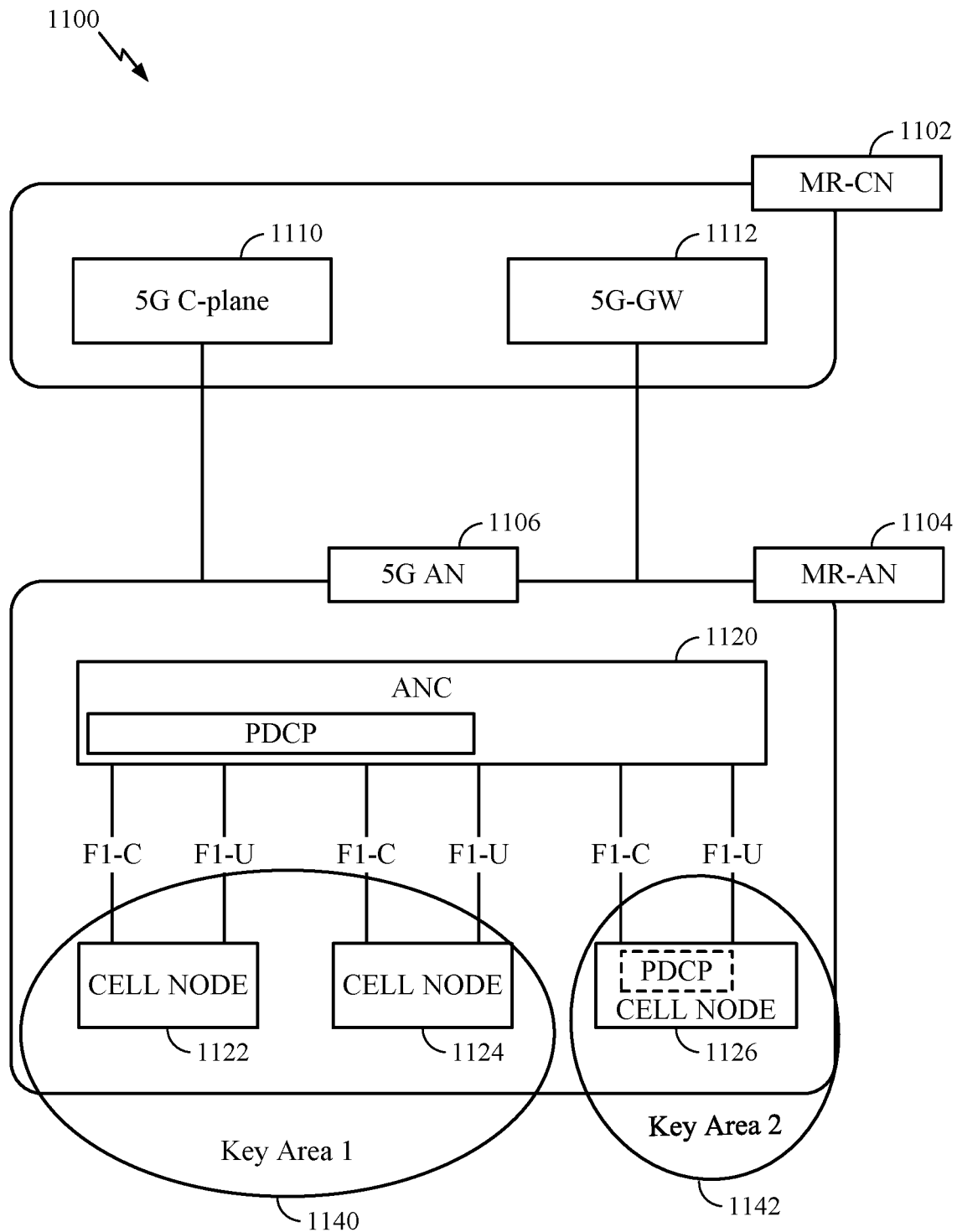
FIG. 11 illustrates an exemplary logical architecture of a 5G radio access network, in accordance with aspects of the present disclosure.

FIG. 11 illustrates an exemplary logical architecture 1100 of a 5G radio access network, in accordance with aspects of the present disclosure. The exemplary architecture may be similar to the architecture 700, shown in FIG. 7. The exemplary architecture includes a multi-RAT core network (MR-CN) 1102 and a multi-RAT access network (MR-AN) 1104. The MR-CN includes a 5G control plane (C-plane) function 1110 and a 5G gateway (GW) 1112. The MR-AN includes a 5G access network (AN) 1106 that includes an access node controller (ANC) 1120 (e.g., a network node) that is connected with a plurality of cell nodes 1122, 1124, 1126.

The cell nodes 1122 and 1124 belong to a first key area 1140, while the cell node 1126 belongs to a second key area 1142. As mentioned above, because the cell nodes 1122 and 1124 belong to the same key area 1140, the PDCP layer for communications occurring via those cell nodes is terminated in the ANC 1120. The second key area 1142 has only the cell node 1126. Because the cell node 1126 is the only cell node in the second key area 1142, the PDCP for communications via cell node 1126 may be terminated in the cell node, as illustrated, or in the ANC.

Figure 12:
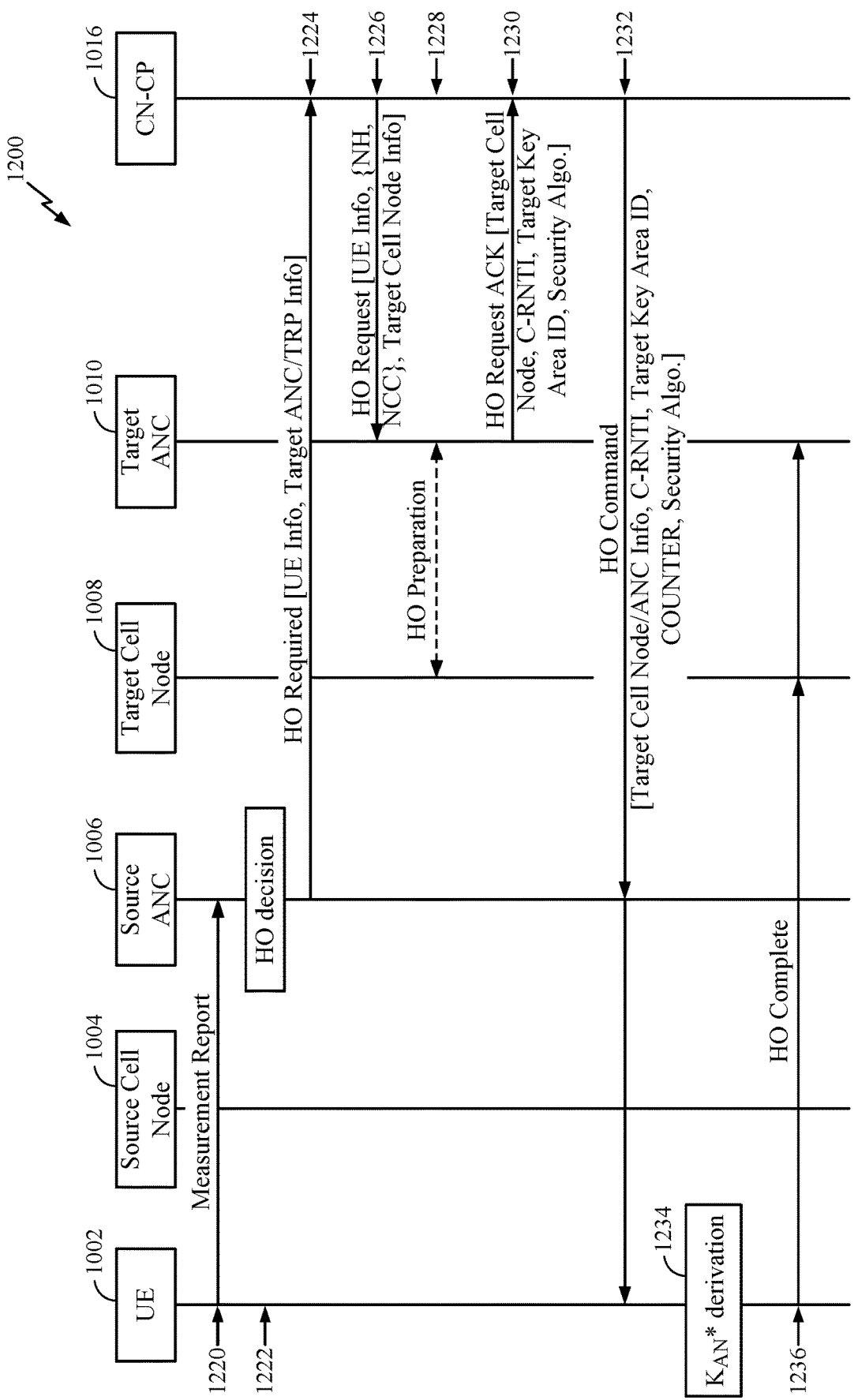
FIG. 12 illustrates an exemplary call flow of the handover shown in FIG. 10A.

FIG. 12 illustrates an exemplary call flow 1200 for an NG2 based handover, as previously mentioned with reference to FIG. 10A. At 1220, the UE 1002 sends measurement reports to the source ANC 1006 that indicate that the UE should handover from the source cell node 1004 to the target cell node 1008. The measurement reports may indicate, for example, that a signal strength of the source cell node is at or below a first threshold, that a signal strength of the target cell node is at or above a second threshold, and/or that the signal strength of the target cell node is a third threshold amount higher than the signal strength of the source cell node.

At 1222, the source ANC 1006 makes a handover decision, based on the measurement reports, that the UE should handover from source cell node 1004 to target cell node 1008.

At 1224, the source ANC sends a HO required message to the core network control plane function (CN-CP) 1016. The CN-CP may be located in the multi-RAT core network, as shown at 1110 in FIG. 11.

At 1226, the CN-CP sends a HO request message to the target ANC 1010. The CN-CP derives a new next hop (NH, which will be used to derive $K_{AN}$) based on the access security management entity key (e.g., $K_{ASME}$), a previous NH, a counter value (e.g., uplink NAS COUNT) or any combination thereof. The CN-CP provides NH and a next hop chaining counter (NCC) to the target ANC as part of the HO request message.

The target ANC prepares the target cell node 1008 to accept the handover at 1228.

The target ANC sends a HO request acknowledgment (ACK) with key area ID and security algorithm information to CN-CP at 1230.

At 1232, the CN-CP sends a HO command to the source ANC. Also at 1232, the source ANC sends a HO command to the UE (over RRCConnectionReconfiguration) with an indication of the key area ID of the target cell node.

At 1234, the UE derives NH based on $K_{ASME}$ and then $K_{AN}$ based on NH and the received key area ID.

At 1236, the UE sends a HO complete message to the target TRP via an RRCConnectionReconfigurationComplete message. The HO complete message is protected by the UE based on the new $K_{AN}$. The UE derives an RRC encryption key ($K_{RRCEnc}$) and an RRC integrity key ($K_{RRCInt}$) from the new $K_{AN}$ and uses $K_{RRCEnc}$ and $K_{RRCInt}$ to protect the RRCConnectionReconfigurationComplete message. The target cell node also reports the HO as complete to the target ANC at 1236.

Figure 13:
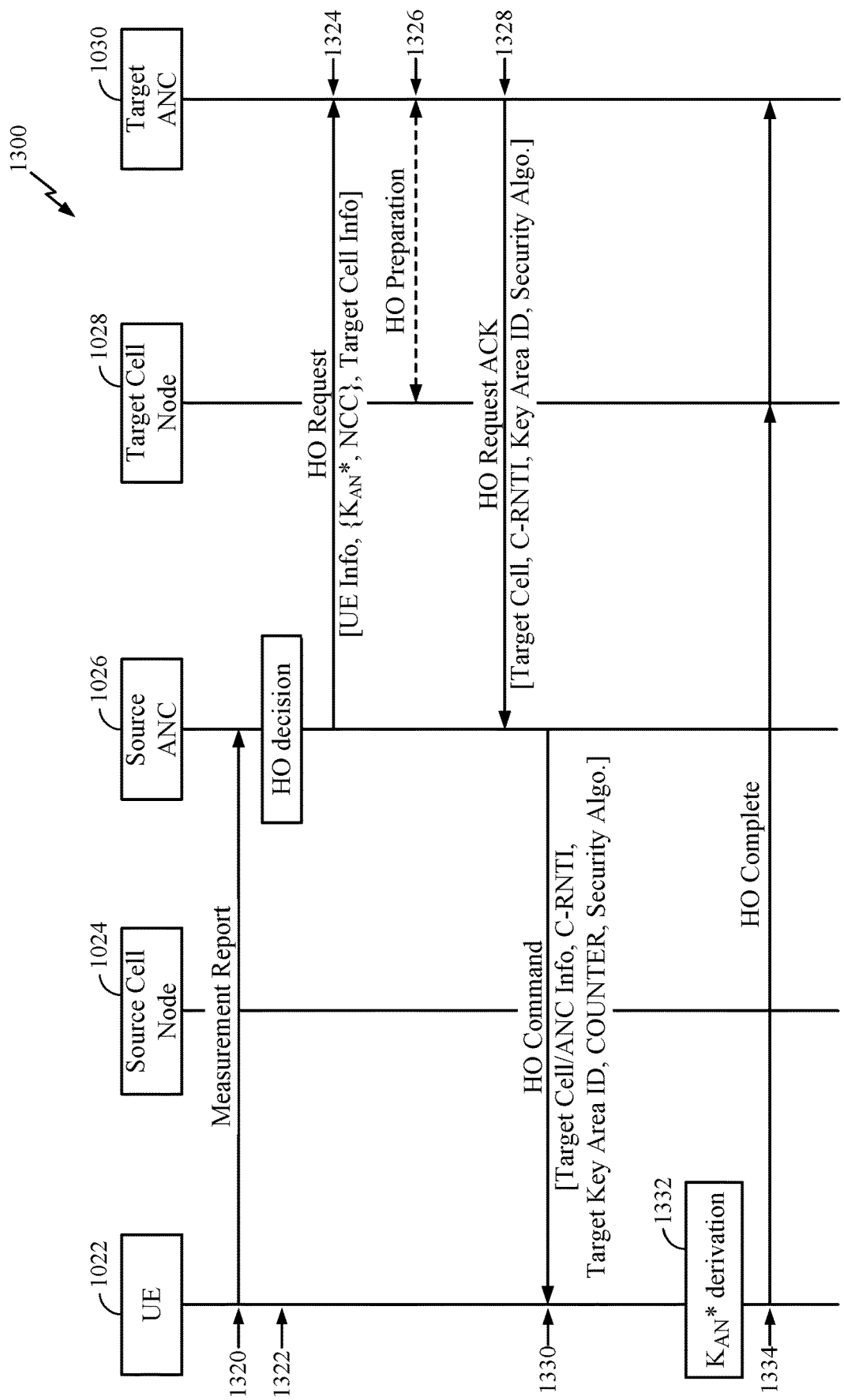
FIG. 13 illustrates an exemplary call flow of the handover shown in FIG. 10B.

FIG. 13 illustrates an exemplary call flow 1300 for an XN2 based handover, as previously mentioned with reference to FIG. 10B. At 1320, UE 1022 sends measurement reports to the source ANC 1026 (e.g., a source network node) that indicate that the UE should handover from the source cell node 1024 to the target cell node 1028.

At 1322, the source ANC makes the decision that the UE should handover from the source cell node to the target cell node.

At 1324, the source ANC sends a HO request message to the target ANC 1030 (e.g., a target network node).

At 1326, the source ANC derives a new $K_{AN}$ based on the current $K_{AN}$ and a COUNTER, provided by the source ANC in the handover request message with the key area ID of the target ANC, and provides the new $K_{AN}$ and other information to the target cell node to prepare the target cell node for the handover of the UE.

The target ANC sends a HO request ACK, including an ID of the target cell node, a C-RNTI for the UE to use, the key area ID of the target cell node, and an indication of a security algorithm for the UE to use to the source ANC at 1328.

The source ANC sends a HO command message, via RRCConnectionReconfiguration, to the UE, including COUNTER and an indication of the key area ID of the target cell node at 1330.

The UE may derive the new $K_{AN}$ based on the current $K_{AN}$ and the received COUNTER and key area ID at 1332.

At 1334, the UE sends a HO complete message to the target TRP via an RRCConnectionReconfigurationComplete message. The HO complete message is protected by the UE, based on the new $K_{AN}$. The UE derives $K_{RRCEnc}$ and $K_{RRCInt}$ from the new $K_{AN}$ and uses $K_{RRCEnc}$ and $K_{RRCInt}$ to protect the RRCConnectionReconfigurationComplete message. According to aspects of the present disclosure, if RLF occurs during the HO, the UE can select any other cell node that belongs to the key area without deriving a new key (or token), because all of the cell nodes in the key area use the same key.

Figure 14:
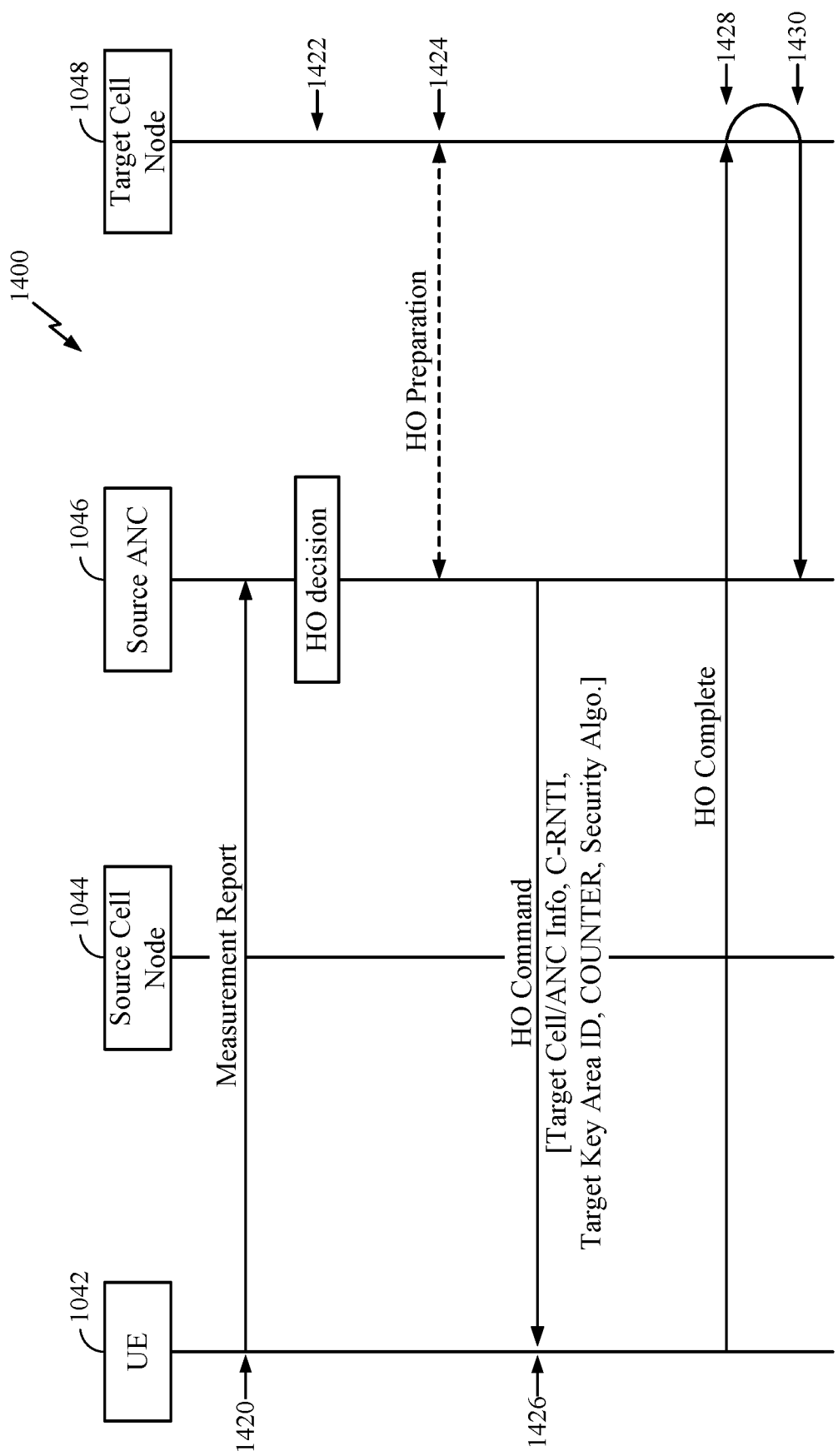
FIG. 14 illustrates an exemplary call flow of the handover shown in FIG. 10C.

FIG. 14 illustrates an exemplary call flow 1400 for an intra-ANC (e.g., intra-network node) handover, as previously mentioned with reference to FIG. 10C. At 1420, the UE 1042 sends measurement reports to the source ANC 1046 that indicate that the UE should handover from the source cell node 1044 to the target cell node 1048.

At 1422, the source ANC makes the decision that the UE should handover from the source cell node to the target cell node.

The ANC prepares the target cell node to receive the handover at 1424.

At 1426, the ANC sends a HO command to the UE, via RRCConnectionReconfiguration, with an indication that the target cell node has the same key area ID as the source cell node.

The UE hands over to the target TRP and sends a HO complete to the target TRP, via RRCConnectionReconfigurationComplete, at 1428. No new key derivation (for $K_{AN}$) is performed by the UE unless explicitly required by the ANC, such as by the ANC incrementing COUNTER.

At 1430, the target cell node reports the handover is complete to the ANC.

According to aspects of the present disclosure, a new AS key may be derived (by the UE and the network) when a state transition occurs, (e.g., RRC_IDLE to RRC_DEDICATED, RRC_COMMON to RRC_DEDICATED). Thus, a small data transfer in RRC_COMMON may not trigger new key derivation, as the UE does not transition to another state.

According to aspects of the present disclosure, a new AS key may be derived (by the UE and the network) whenever a UE moves into a new key area. Thus, if a RLF occurs while a UE is in RRC_DEDICATED state, if the UE reselects to a cell/TRP in the same key area, then no AS key derivation may be performed. Because no new AS key is derived, buffered ciphered packets (e.g., at the UE and at the network) can be transmitted without being reciphered.

According to aspects of the present disclosure, a new AS key may be derived as a result of a network trigger. The network can trigger a UE to derive a new AS key (e.g., due to security policies) even when the UE has not undergone a state transition or moved into a new key area. Incrementing a counter is one example of how the network may trigger a new key derivation for a UE.

Figure 15:
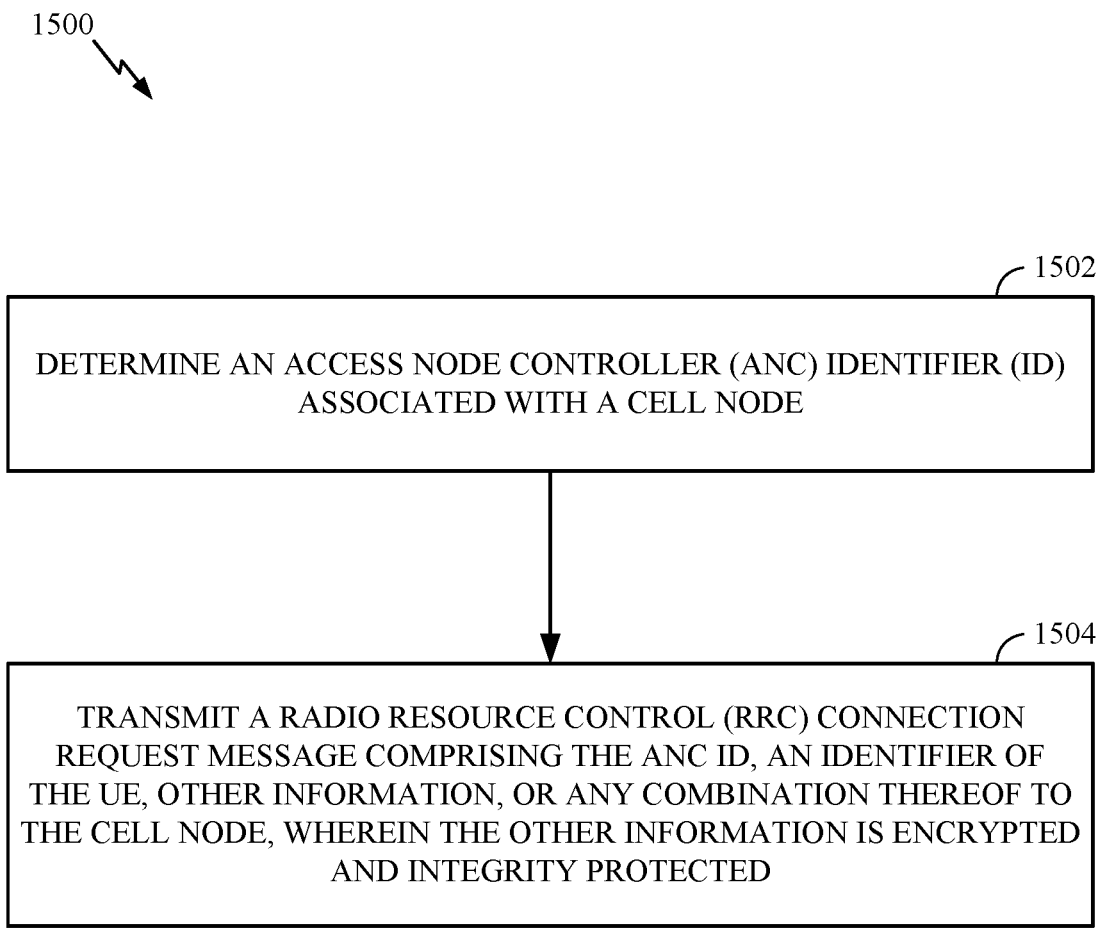
FIG. 15 illustrates example operations for wireless communications by a user equipment (UE), in accordance with aspects of the present disclosure.

FIG. 15 illustrates example operations 1500 for wireless communications by a user equipment (UE), according to aspects of the present disclosure. The operations 1500 may be performed, for example, by UE 120, shown in FIG. 1.

Operations 1500 may begin at 1502 by the UE determining an access node controller (ANC, e.g., a network node) identifier (ID) associated with a cell node. For example, a UE, such as UE 120 shown in FIG. 1, may determine an ANC ID of ANC 1120, which is associated with the cell node 1122, shown in FIG. 11.

At 1504, the UE transmits a radio resource control (RRC) connection request message comprising the ANC ID, an identifier of the UE, other information, or any combination thereof to the cell node, wherein the other information is encrypted and integrity protected. Continuing the example, the UE transmits an RRC connection request message including the ANC ID determined at block 1502, a UE ID, and other encrypted and integrity protected information.

Figure 16:
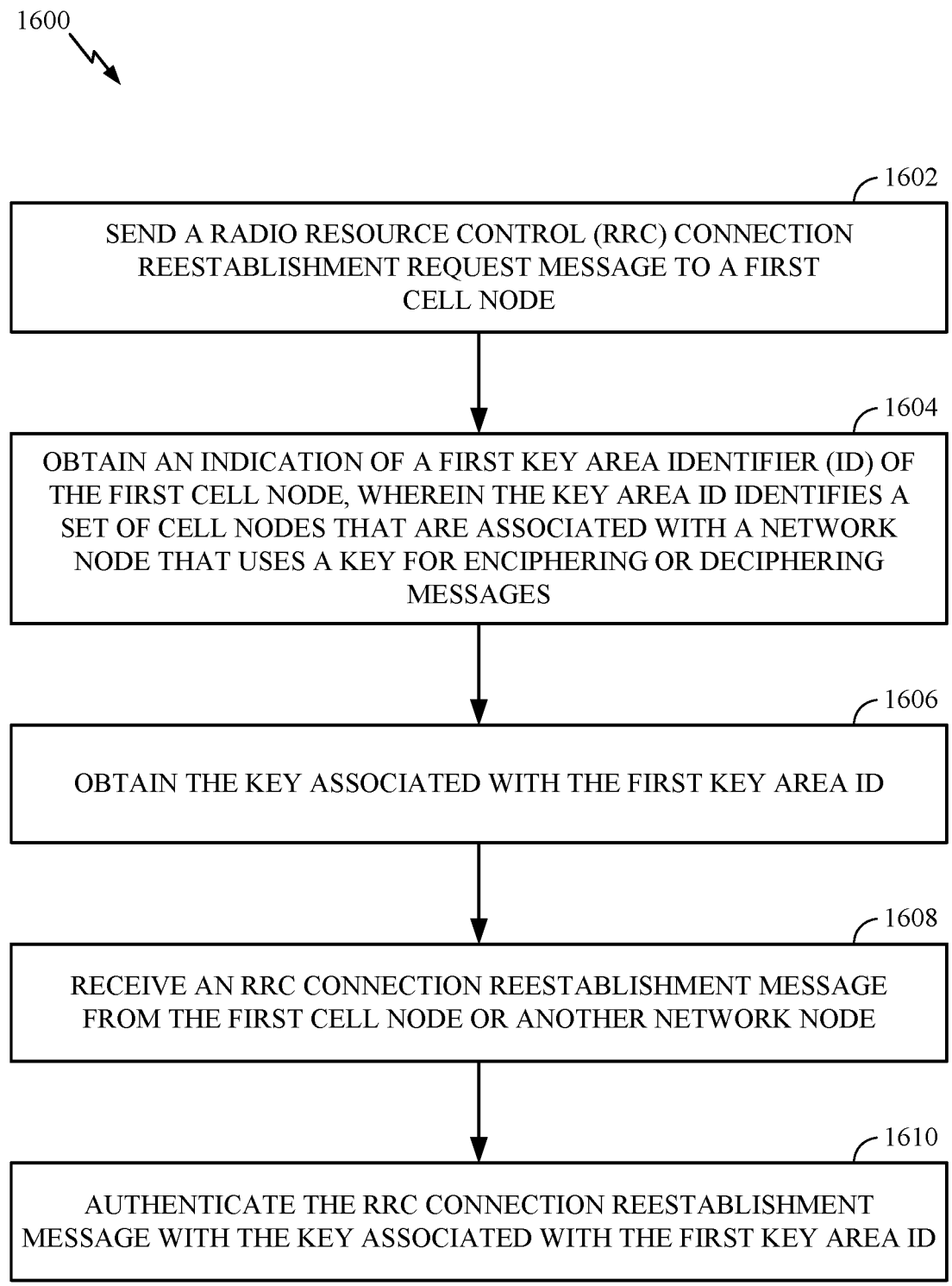
FIG. 16 illustrates example operations for wireless communications by a user equipment (UE), in accordance with aspects of the present disclosure.

FIG. 16 illustrates example operations 1600 for wireless communications by a user equipment (UE), according to aspects of the present disclosure. The operations 1600 may be performed, for example, by UE 120, shown in FIG. 1.

Operations 1600 may begin at 1602 by the UE sending a radio resource control (RRC) connection reestablishment request message to a first cell node. In the example, the UE may have previously had an RRC connection established with a cell node that is part of BS 110r, shown in FIG. 1, and the UE sends an RRC connection reestablishment request message to the cell node.

At 1604, the UE obtains an indication of a first key area identifier (ID) of the first cell node, wherein the key area ID identifies a set of cell nodes that are associated with a network node that uses a key for enciphering or deciphering messages. Continuing the example, the UE may have obtained an indication of a first key area ID of the cell node when the UE was RRC connected to the cell node. In the example, the indication may be a list of identifiers of cell nodes that have access to an encryption key associated with the first key area ID. In the example, the cell nodes in the list may be associated with an ANC that makes the encryption key available to the cell nodes in the list.

Operations 1600 continue at 1606 with the UE obtaining the key associated with the first key area ID. Continuing the example, the UE may have obtained the key when the UE was previously connected with the cell node.

At 1608, the UE receives an RRC connection reestablishment message from the first cell node or another network node. Continuing the example, the UE receives an RRC connection reestablishment message from a cell node that is part of BS 110 (shown in FIG. 1).

Operations 1600 continue at 1610 with the UE authenticating the RRC connection reestablishment message with the key associated with the first key area ID. Continuing the example, the UE authenticates the RRC connection reestablishment message using the key that the UE obtained at block 1606.

According to aspects of the present disclosure and as previously mentioned, an indication of a key area ID that a UE may obtain (e.g., the indication obtained in block 1604 in FIG. 16) may comprise a list of identifiers of cell nodes that are associated with a network node (e.g. an ANC) that uses the common key associated with the key area ID for enciphering and deciphering packets.

In aspects of the present disclosure, a list of identifiers of cell nodes may be transmitted by a network node via an RRC signal, and the list of identifiers may be obtained by a UE from the RRC signal.

According to aspects of the present disclosure, a list of identifiers of cell nodes that are associated with a network node (e.g., that uses the common key associated with the key area ID) may comprise a list of physical cell identifiers (PCIs) that are associated with the cell nodes.

Figure 17:
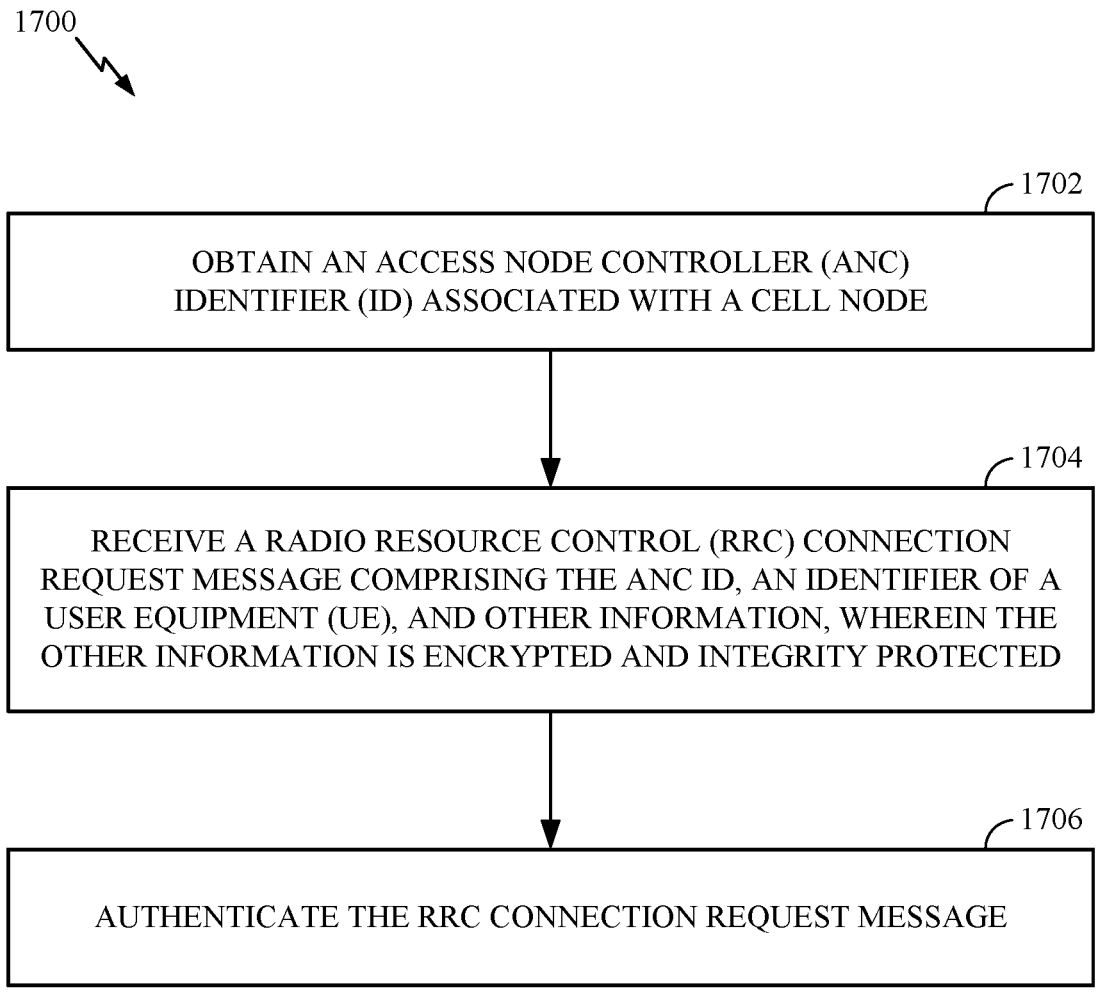
FIG. 17 illustrates example operations for wireless communications by a wireless node, in accordance with aspects of the present disclosure.

FIG. 17 illustrates example operations 1700 for wireless communications by a network node, according to aspects of the present disclosure. The operations 1700 may be performed by a cell node, ANC, or a base station, for example, BS 110, shown in FIG. 1, and may be considered complementary to the operations 1500 shown in FIG. 15.

Operations 1700 may begin at 1702 by the network node obtaining an access node controller (ANC) identifier (ID) associated with a cell node. For example, ANC 1120 may obtain an ANC ID of the ANC associated with the cell node 1122, shown in FIG. 11

At 1704, the network node receives a radio resource control (RRC) connection request message comprising one or more of the ANC ID, an identifier of a user equipment (UE), and other information, wherein the other information is encrypted and integrity protected. Continuing the example, the ANC may receive an RRC connection request message from a UE (e.g., UE 120, shown in FIG. 1), and the RRC connection request message may comprise the ANC ID matching the ANC ID obtained by the ANC in block 1702, an ID of the UE, and other encrypted and integrity protected information. In the example, the other information may be encrypted and integrity protected using a key maintained by the ANC.

Operations 1700 continue at 1706 with the network node authenticating the other information in the RRC connection request message. Continuing the example from above, the ANC may authenticate the other information in the RRC connection request message by using a key maintained by the ANC. In the example, the ANC may determine to use the key based on the presence of the ANC ID in the RRC connection request message.

Figure 18:
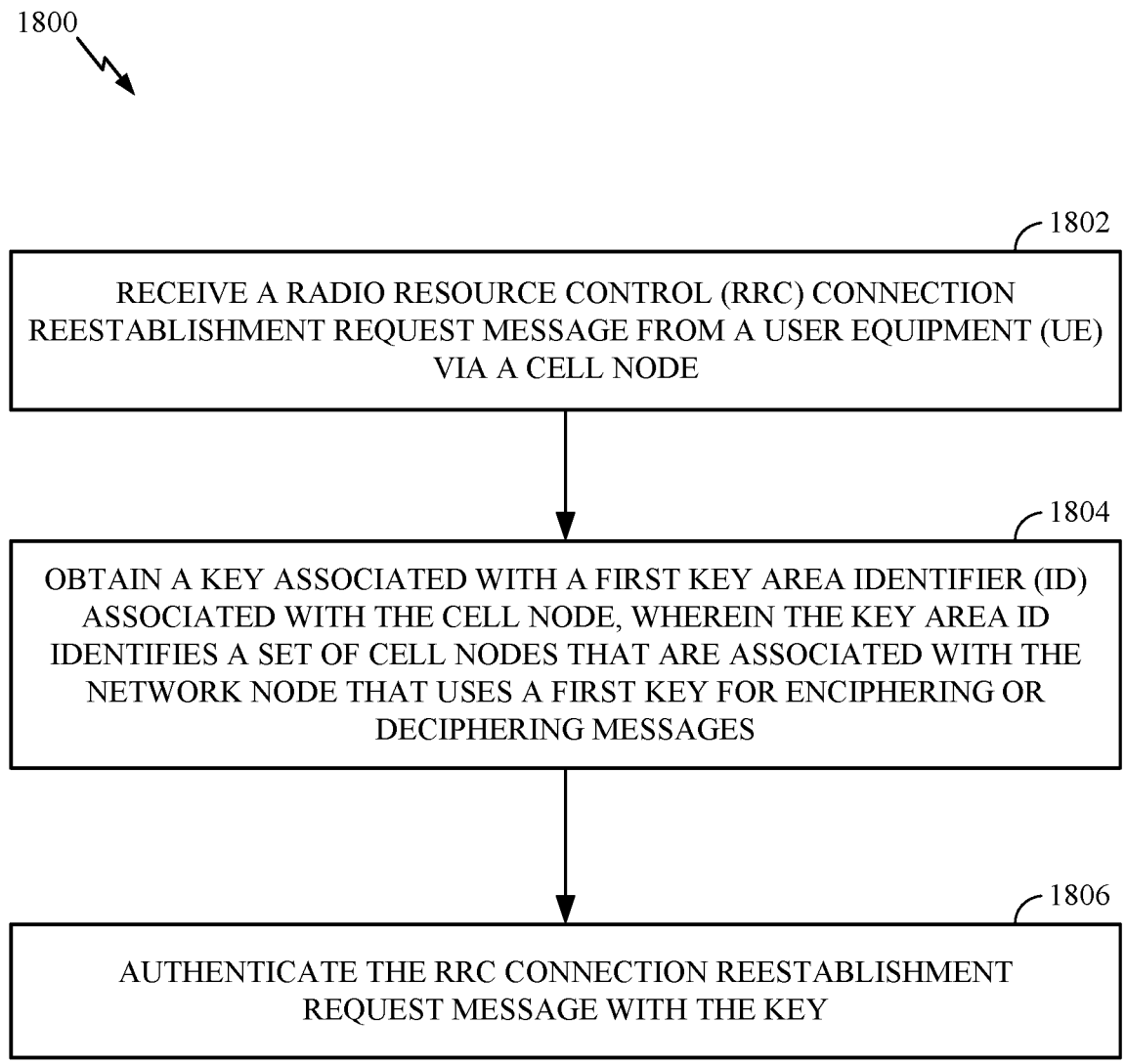
FIG. 18 illustrates example operations for wireless communications by a wireless node, in accordance with aspects of the present disclosure.

FIG. 18 illustrates example operations 1800 for wireless communications by a network node, according to aspects of the present disclosure. The operations 1800 may be performed by a network node such as ANC 1120 shown in FIG. 11 or a base station, for example, BS 110, shown in FIG. 1, and may be considered complementary to the operations 1600 shown in FIG. 16.

Operations 1800 may begin at 1802 by the network node receiving a radio resource control (RRC) connection reestablishment request message from a user equipment (UE) via a cell node. For example, ANC 1120, shown in FIG. 11, receives an RRC connection reestablishment request message from UE 120 (shown in FIG. 1) via TRP 1122.

At 1804, the network node obtains a key associated with a first key area identifier (ID) associated with the cell node, wherein the key area ID identifies a set of cell nodes that are associated with the network node that uses a first key for enciphering or deciphering messages. Continuing the example, the ANC obtains a key associated with a first key area ID, wherein the first key area ID identifies a set of cell nodes that are associated with the ANC that uses the key for enciphering and deciphering messages. In the example, the set of cell nodes includes the cell node 1122, and the network node may be the BS 110 or the ANC 1120 that controls the set of cell nodes.

Operations 1800 continue at 1806 with the network node authenticating the RRC connection reestablishment request message with the key. Continuing the example from above, the ANC authenticates the RRC connection reestablishment request message with the key obtained in block 1804.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    obtaining an indication of a key area identifier (ID) of a first cell node, wherein the key area ID identifies a set of cell nodes that are associated with a network node that uses a first key for enciphering or deciphering messages;
    communicating a first set of messages with the first cell node using the first key for enciphering or deciphering the first set of messages;
    deriving a second key based on the first key and a counter;
    using the second key for enciphering or deciphering a second set of messages to or from the first cell node or a second cell node;
    receiving a third set of messages, enciphered using the second key, indicating a third key from the second cell node;
    using the third key for enciphering or deciphering a fourth set of messages to or from the second cell node;
    obtaining another indication of the key area ID from the second cell node; and
    communicating a fifth set of messages with the second cell node using the second key for enciphering or deciphering portions of each of the fifth set of messages.

2. The method of claim 1, wherein the fifth set of messages comprises radio resource control (RRC) connection request messages.

3. The method of claim 1, further comprising receiving an indication of a key change and the counter from the first cell node or the second cell node.

4. A method for wireless communications by a user equipment (UE), comprising:
    obtaining an indication of a key area identifier (ID) of a first cell node, wherein the key area ID identifies a set of cell nodes that are associated with a network node that uses a first key for enciphering or deciphering messages;
    communicating a first set of messages with the first cell node using the first key for enciphering or deciphering the first set of messages;
    deriving a second key based on the first key and a counter;
    using the second key for enciphering or deciphering a second set of messages to or from the first cell node or a second cell node;
    receiving a third set of messages, enciphered using the second key, indicating a third key from the second cell node;
    using the third key for enciphering or deciphering a fourth set of messages to or from the second cell node;
    obtaining another indication of the key area ID from the second cell node; and
    communicating a fifth set of messages with the second cell node using the first key for enciphering or deciphering the fifth set of messages.

5. A method for wireless communications by a user equipment (UE), comprising:
    obtaining an indication of a key area identifier (ID) of a first cell node, wherein the key area ID identifies a set of cell nodes that are associated with a network node that uses a first key for enciphering or deciphering messages;
    communicating a first set of messages with the first cell node using the first key for enciphering or deciphering the first set of messages;
    deriving a second key based on the first key and a counter;
    using the second key for enciphering or deciphering a second set of messages to or from the first cell node or a second cell node;
    receiving a third set of messages, enciphered using the second key, indicating a third key from the second cell node;
    using the third key for enciphering or deciphering a fourth set of messages to or from the second cell node;
    receiving a fifth set of messages, enciphered using the first key, indicating the second key from the first cell node; and
    using the second key for enciphering or deciphering a sixth set of messages to or from the first cell node.

* * * * *